United States Patent
Yoshida et al.

(10) Patent No.: US 12,110,661 B2
(45) Date of Patent: Oct. 8, 2024

(54) EXCAVATION SYSTEM, WORK SYSTEM, CONTROL DEVICE, CONTROL METHOD, AND NON-TRANSITORY COMPUTER-READABLE MEDIUM STORING A PROGRAM

(71) Applicant: NEC Corporation, Tokyo (JP)

(72) Inventors: Hiroshi Yoshida, Tokyo (JP); Tatsuya Yoshimoto, Tokyo (JP); Daisuke Ohta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 221 days.

(21) Appl. No.: 17/618,029

(22) PCT Filed: Jun. 3, 2020

(86) PCT No.: PCT/JP2020/021923
§ 371 (c)(1),
(2) Date: Dec. 10, 2021

(87) PCT Pub. No.: WO2020/255714
PCT Pub. Date: Dec. 24, 2020

(65) Prior Publication Data
US 2022/0259823 A1 Aug. 18, 2022

(30) Foreign Application Priority Data
Jun. 18, 2019 (JP) ................................. 2019-113106

(51) Int. Cl.
*E02F 9/20* (2006.01)
*G05D 1/00* (2024.01)
*H04Q 9/00* (2006.01)

(52) U.S. Cl.
CPC ......... *E02F 9/2054* (2013.01); *G05D 1/0291* (2013.01); *H04Q 9/00* (2013.01); *G05D 1/0231* (2013.01)

(58) Field of Classification Search
CPC ......... E02F 3/435; E02F 9/2045; E02F 9/205; E02F 9/2054; E02F 9/262; E02F 9/265;
(Continued)

(56) References Cited

U.S. PATENT DOCUMENTS 6,247,538 B1 6/2001 Takeda et al.
8,422,825 B1 * 4/2013 Neophytou ............... G06F 3/14
382/294

(Continued)

FOREIGN PATENT DOCUMENTS

EP 3235961 A1 10/2017
JP H07-180192 A 7/1995
(Continued)

OTHER PUBLICATIONS

Extended European Search Report for EP Application No. EP20826023.2 dated on Jul. 7, 2022.
(Continued)

*Primary Examiner* — Babar Sarwar
(74) *Attorney, Agent, or Firm* — Sughrue Mion, PLLC

(57) ABSTRACT

The present invention provides an excavation system capable of improving the work efficiency at a worksite. An excavation device (20) excavates an object (80) treated as an excavation target at an excavation spot. A first detection device (2) is installed at an excavation spot away from the excavation device (20). The first detection device (2) detects information related to the object (80) at the excavation spot. A control device (10) transmits, to the excavation device (20), control information related to operations of the excavation device (20) based on target location data indicating the position of the object (80), which corresponds to information related to the object (80). The excavation device (20) executes operations for excavation in accordance with the control information.

10 Claims, 20 Drawing Sheets

(58) Field of Classification Search
CPC ............... G05D 1/0231; G05D 1/0291; G05D 2201/0202; G06Q 10/063; G06Q 50/08; H04Q 9/00
See application file for complete search history.

(56) References Cited

U.S. PATENT DOCUMENTS

| | | | |
|---|---|---|---|
| 9,218,789 B1* | 12/2015 | Lininger | ................... G09G 5/00 |
| 10,684,137 B2* | 6/2020 | Kean | ................... G01C 21/3647 |
| 11,157,849 B2* | 10/2021 | Shike | ............... G06Q 10/06313 |
| 2005/0268245 A1* | 12/2005 | Gipps | ..................... G06F 30/13 |
| | | | 715/762 |
| 2006/0026101 A1* | 2/2006 | Ogura | ....................... E02F 9/26 |
| | | | 705/50 |
| 2006/0044307 A1* | 3/2006 | Song | ..................... G06T 11/206 |
| | | | 345/419 |
| 2007/0100760 A1* | 5/2007 | Dawson | ................. G06Q 10/06 |
| | | | 705/52 |
| 2011/0257816 A1* | 10/2011 | Song | ..................... E02F 9/2008 |
| | | | 701/2 |
| 2013/0261902 A1* | 10/2013 | Zhdanov | .............. E02F 3/7618 |
| | | | 701/50 |
| 2014/0229055 A1 | 8/2014 | Itoi et al. | |
| 2014/0285375 A1* | 9/2014 | Crain | ....................... G01S 17/86 |
| | | | 342/25 A |
| 2014/0297091 A1 | 10/2014 | Itoi et al. | |
| 2014/0316633 A1 | 10/2014 | Tsujimoto et al. | |
| 2015/0362358 A1* | 12/2015 | Jensen | ............ G06Q 10/06393 |
| | | | 414/21 |
| 2016/0237655 A1* | 8/2016 | Baba | ..................... E02F 9/2037 |
| 2016/0376772 A1* | 12/2016 | Kondo | ..................... E02F 9/264 |
| | | | 701/34.4 |
| 2017/0073935 A1 | 3/2017 | Friend et al. | |
| 2017/0328030 A1 | 11/2017 | Yamada et al. | |
| 2018/0218304 A1* | 8/2018 | Shike | ................. G06Q 10/0631 |
| 2020/0293037 A1* | 9/2020 | Kauppinen | .......... G05D 1/0033 |

FOREIGN PATENT DOCUMENTS

| | | |
|---|---|---|
| JP | H10-088625 A | 4/1998 |
| JP | 2013-096198 A | 5/2013 |
| JP | 2013-098940 A | 5/2013 |
| JP | 2016-089559 A | 5/2016 |
| JP | 2017-071916 A | 4/2017 |
| WO | 2016/121010 A1 | 8/2016 |

OTHER PUBLICATIONS

International Search Report for PCT Application No. PCT/JP2020/021923, mailed on Sep. 1, 2020.
JP Office Action for JP Application No. 2023-090093, mailed on Mar. 12, 2024 with English Translation.

* cited by examiner

EXCAVATION SYSTEM, WORK SYSTEM, CONTROL DEVICE, CONTROL METHOD, AND NON-TRANSITORY COMPUTER-READABLE MEDIUM STORING A PROGRAM

This application is a National Stage Entry of PCT/JP2020/021923 filed on Jun. 3, 2020, which claims priority from Japanese Patent Application 2019-113106 filed on Jun. 18, 2019, the contents of all of which are incorporated herein by reference, in their entirety.

TECHNICAL FIELD

The present invention relates to an excavation system, a work system, a control device, a control method, and a non-transitory computer-readable medium on which a program is stored.

BACKGROUND ART

In order to reduce labor costs and the like, it is becoming more common for a work machine to be self-controlled or remotely controlled at worksites where the work machine performs work. Regarding this technology, Patent Literature 1 discloses a work machine operation system. The system according to Patent Literature 1 acquires the shape of an excavation target through a stereo camera installed on the upper slewing body of a hydraulic excavator. With this arrangement, the system according to Patent Literature 1 achieves remote control or self-control.

CITATION LIST

Patent Literature

Patent Literature 1: International Patent Publication No. WO 2016/121010

SUMMARY OF INVENTION

Technical Problem

In the system according to Patent Literature 1, a camera used to acquire the shape of an excavation target is attached to a work machine. In this way, with a method of using a camera attached to the work machine, captured images are limited to images that can be obtained from the work machine, making it difficult to detect objects in a blind spot of the work machine and control the work machine with consideration for the blind spot. Furthermore, in the case of attaching a camera to the work machine, there is a possibility of blurry camera images due to shaking or the like of the work machine itself, and there are concerns about being unable to capture an object accurately. Consequently, with the system according to Patent Literature 1, there is a possibility of degraded work efficiency.

The present disclosure has been devised to address problems like the above, and an objective thereof is to provide an excavation system, a work system, a control device, a control method, and a program capable of improving the work efficiency at a worksite.

Solution to Problem

An excavation system according to the present disclosure includes an excavation device configured to excavate an object treated as a target of excavation at an excavation spot, a first detection device installed at the excavation spot and configured to detect information related to the object, and a control device configured to transmit control information related to operations of the excavation device to the excavation device based on target location data indicating a position of the object corresponding to the information related to the object, wherein the excavation device executes operations for excavation in accordance with the control information.

Also, a control device according to the present disclosure includes acquisition means for acquiring target location data indicating a position of an object treated as a target to be excavated by an excavation device at an excavation spot, the target location data corresponding to information related to the object detected by a first detection device installed at the excavation spot, determination means for determining operations of the excavation device based on the target location data, and transmission means for transmitting control information related to operations of the excavation device to the excavation device.

Also, a control method according to the present disclosure includes acquiring target location data indicating a position of an object treated as a target to be excavated by an excavation device at an excavation spot, the target location data corresponding to information related to the object detected by a first detection device installed at the excavation spot, determining operations of the excavation device based on the target location data, and transmitting control information related to operations of the excavation device to the excavation device.

Also, a program according to the present disclosure causes a computer to execute a process including acquiring target location data indicating a position of an object treated as a target to be excavated by an excavation device at an excavation spot, the target location data corresponding to information related to the object detected by a first detection device installed at the excavation spot, determining operations of the excavation device based on the target location data, and transmitting control information related to operations of the excavation device to the excavation device.

Advantageous Effects of Invention

According to the present disclosure, an excavation system, a work system, a control device, a control method, and a program capable of improving the work efficiency at a worksite can be provided.

DESCRIPTION OF EMBODIMENTS

First Example Embodiment

Figure 1:
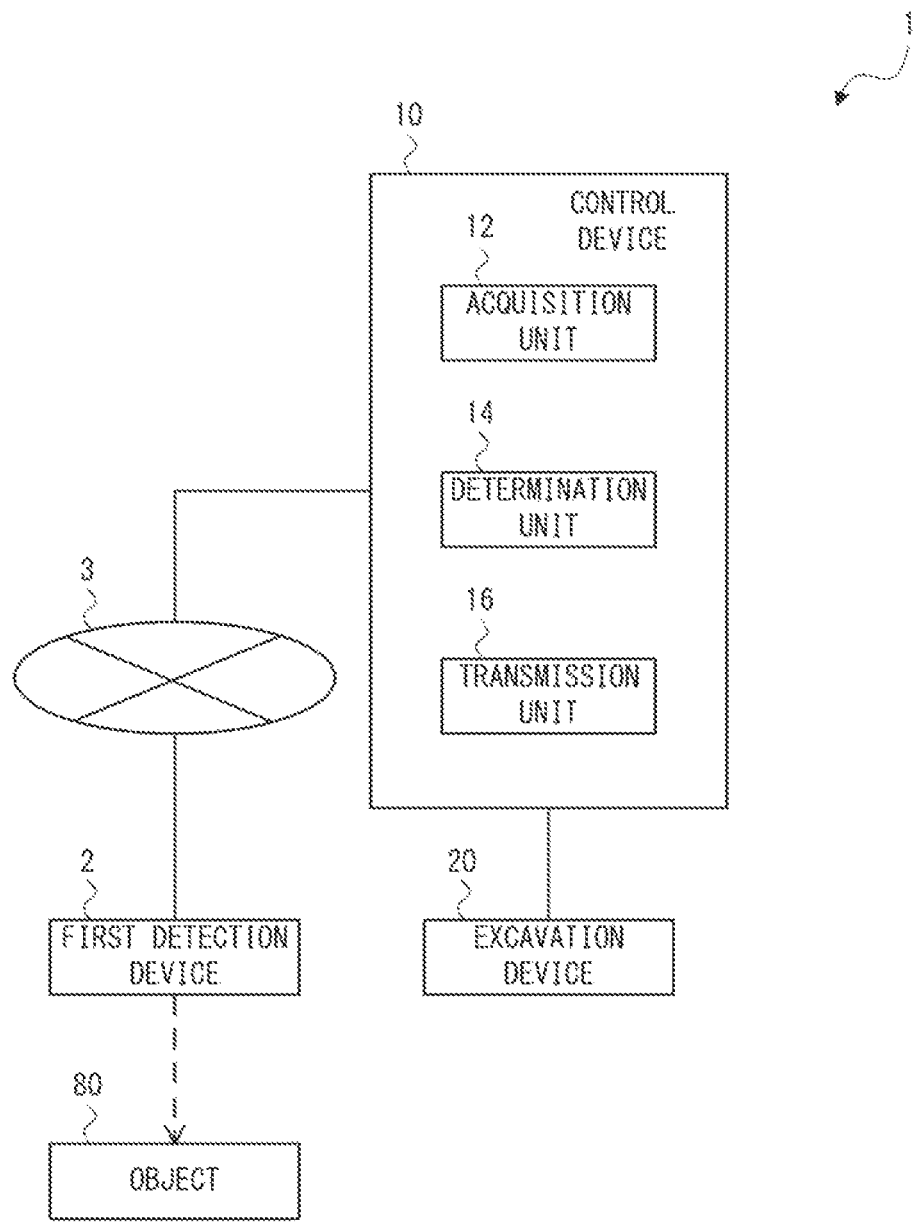
FIG. 1 is a diagram illustrating a configuration of an excavation system according to a first example embodiment.

Hereinafter, example embodiments will be described with reference to the drawings. To clarify the explanation, the following description and drawings are abbreviated or simplified where appropriate. Also, in the drawings, like elements are denoted with like signs, and a duplicate description of such elements is omitted where appropriate.

Figure 6:
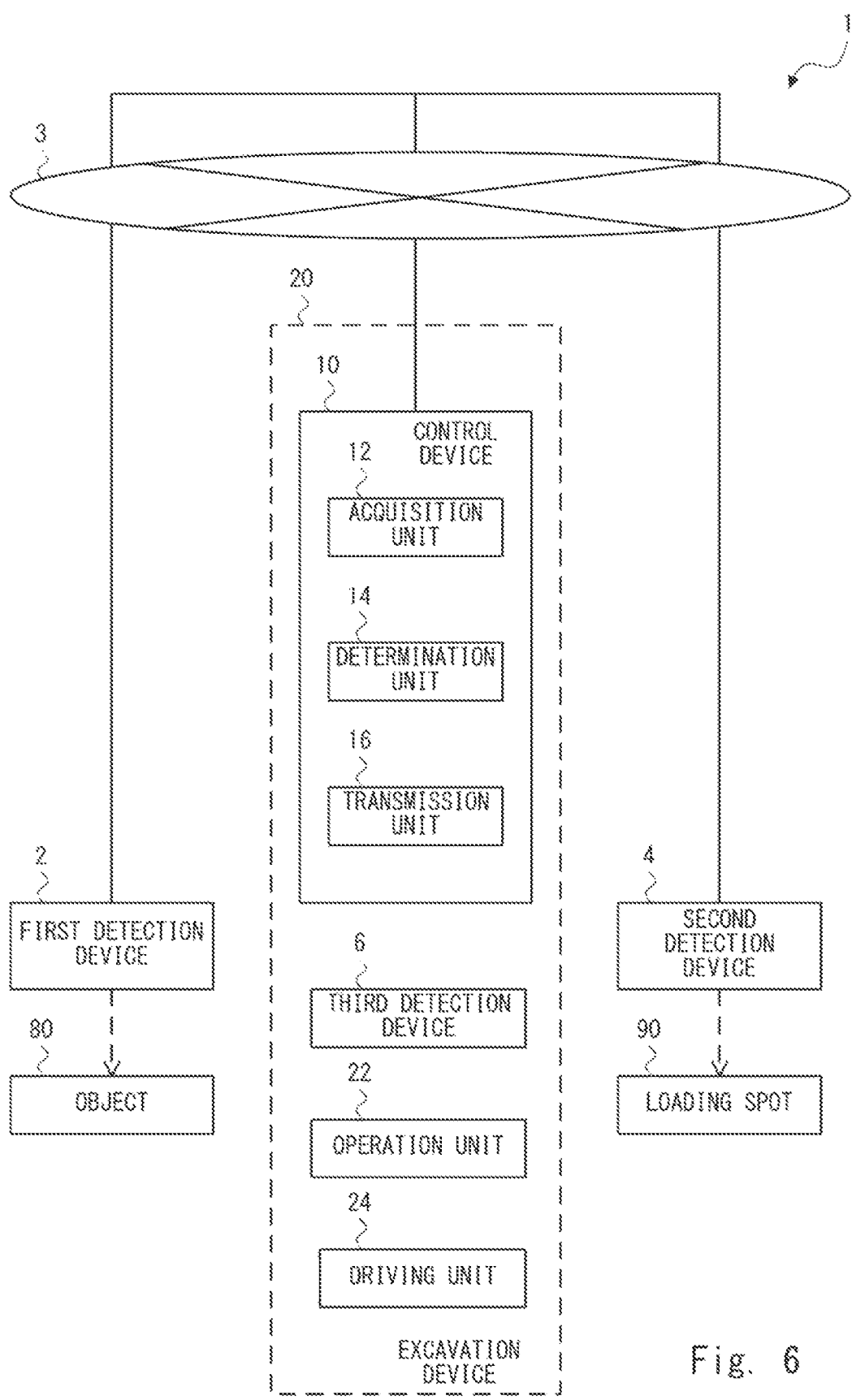
FIG. 6 is a diagram illustrating a configuration of an excavation system according to the third example embodiment.

FIG. 1 is a diagram illustrating a configuration of an excavation system 1 according to the first example embodiment. The excavation system 1 according to the first example embodiment includes a first detection device 2, an excavation device 20, and a control device 10. The control device 10 is communicably connected to the first detection device 2 through a network 3. The network 3 may be a wireless network or a wired network, for example. In other words, the control device 10 has a wireless or wired connection to the first detection device 2. The wireless network may be a network using a communication channel standard such as Long Term Evolution (LTE), or a network used in a specific area, such as Wi-Fi(R) or local 5G. The wired network may be a local area network (LAN) or optical fiber, for example. The control device 10 may be communicably connected to the excavation device 20. Note that in FIG. 1, the control device 10 is illustrated distinctly from the excavation device 20, but as illustrated in FIG. 6 described later, the control device 10 may also be installed onboard the excavation device 20.

The excavation device 20 (i.e., excavation apparatus or excavating machine) excavates an object 80 treated as an excavation target at an excavation spot. In other words, the object 80 is excavated by the excavation device 20 at the excavation spot. Here, an "excavation spot" refers to part or all of an area where the excavation device 20 performs excavation work. The object 80 is dirt, for example, but is not limited thereto. The object 80 may be any object of excavation, such as a garbage deposit, rocks, gravel, concrete, or members from a building to be torn down. The excavation device 20 is a construction machine such as a hydraulic excavator or a backhoe, for example, but is not limited thereto. The excavation device 20 may be a work machine (excavation machine) of any type, including a construction machine such as a wheel loader and a shovel loader.

The first detection device 2 (first detection device) is installed in a location away from the excavation device 20. The first detection device 2 detects information (object information) related to the object 80 at the excavation spot. The first detection device 2 is a three-dimensional sensor (3D sensor) such as a 3D LiDAR sensor, a stereo camera, or a time-of-flight (ToF) camera, for example, but is not limited thereto.

The first detection device 2 is installed so as to be capable of monitoring the object 80 at the excavation spot, for example. The first detection device 2 is installed above the excavation spot, for example. With this arrangement, the first detection device 2 can detect the state of the object 80 at the excavation spot. In other words, the first detection device 2 is installed at a position where the state of the object 80 at the excavation spot is detectable. Furthermore, the "object information" is information indicating the position of the object 80 at the excavation spot, for example. For instance, in the case where the first detection device 2 is a 3D LiDAR sensor, the object information may be three-dimensional coordinate information about the object 80. Also, in the case where the first detection device 2 is a stereo camera, the object information may be a three-dimensional captured image. However, the object information is not limited to the above.

The control device 10 is an information processing device such as a computer, for example. The control device 10 is a server such as a self-control server, for example. The control device 10 may also be achieved by cloud computing. The control device 10 includes an acquisition unit 12, a determination unit 14, and a transmission unit 16. The acquisition unit 12 functions as acquisition means. The determination unit 14 functions as determination means. The transmission unit 16 functions as transmission means. With these components, the control device 10 transmits to the excavation device 20 control information related to operations of the excavation device 20 determined on the basis of (i.e., based on) target location data indicating the position of the object 80 acquired on the basis of the information related to the object 80. In other words, the control device 10 transmits control information to the excavation device 20 on the basis of target location data corresponding to the information related to the object 80. The excavation device 20 executes operations for excavating (excavation operations) according to the control information. Note that operations of the acquisition unit 12, the determination unit 14, and the transmission unit 16 according to the first example embodiment will be described later.

Figure 2:
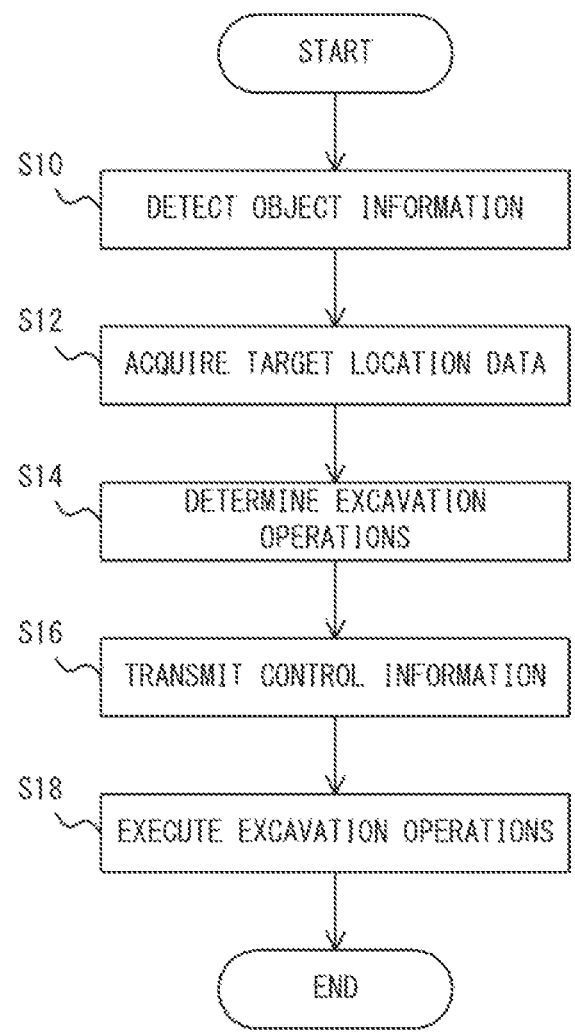
FIG. 2 is a flowchart illustrating a process executed by the excavation system according to the first example embodiment.

FIG. 2 is a flowchart illustrating a process executed by the excavation system 1 according to the first example embodiment. Note that FIG. 2 illustrates a control method (S12 to S16) executed by the control device 10 according to the first example embodiment. As described above, the first detection device 2 detects object information (step S10).

The control device 10 acquires target location data indicating the position of the object 80 (step S12). Specifically, the acquisition unit 12 acquires target location data. The acquisition unit 12 may also use the object information to calculate the target location data. Alternatively, the acquisition unit 12 may acquire (receive) target location data from an intermediate control device (described later) that has calculated the target location data using the object information.

Here, the target location data is data indicating the shape or the three-dimensional coordinate position of the dirt at the excavation spot, for example. In other words, through the processing by the acquisition unit 12, the control device 10 can ascertain the shape of the object 80 such as dirt. For example, in the case where the first detection device 2 is a 3D LiDAR sensor, the target location data may be three-dimensional map data in which a point cloud obtained by 3D LiDAR is plotted. Also, in the case where the first detection device 2 is a stereo camera, the target location data may be three-dimensional image data. The target location data may also be gradient data calculated geometrically from object information (three-dimensional coordinate information) obtained from the first detection device 2. Gradient data may indicate the gradient of the object 80 (such as dirt) at a certain position in the excavation spot. Also, the target location data may be data (dirt quantity data, for example) indicating the quantity (volume) of the object 80 calculated geometrically from object information (three-dimensional coordinate information) obtained from the first detection device 2. The dirt quantity data may indicate the volume of dirt in a certain region of the excavation spot.

The control device 10 determines operations of the excavation device 20 on the basis of the target location data acquired by the acquisition unit 12 (step S14). Specifically, the determination unit 14 determines excavation operations of the excavation device 20 on the basis of the target location data. More specifically, the determination unit 14 determines a position where the object 80 should be excavated (excavation position) from the position and shape of the object 80. Moreover, the determination unit 14 determines how the excavation device 20 should operate to excavate the excavation position. In addition, the determination unit 14 may generate control information related to the determined operations. The control information is information (commands) for causing the excavation device 20 to execute specified operations. For example, in the case where the excavation device 20 is a hydraulic excavator, the control information may include information such as a movement path of a bucket to the excavation position, the angles and angular speeds of the links and the like of an arm for achieving the movement path, and the movement speed of the excavation device 20.

Furthermore, the excavation position may be determined according to various conditions. The conditions for determining the excavation position may be any one or more selected by an administrator from among the conditions given as examples below. Alternatively, the determination unit 14 may appropriately modify the conditions given as examples below according to the excavation situation.

For example, the determination unit 14 may determine an area where dirt is piled up in a predetermined excavation range of the excavation spot as the excavation position. Note that the determination unit 14 may use information such as dirt quantity data to identify (i.e., determine) a region where the quantity of dirt exceeds a predetermined threshold or the region with the greatest quantity of dirt as the "area where dirt is piled up".

In addition, the determination unit 14 may use information such as three-dimensional map data or three-dimensional image data to identify (i.e., determine) the area where dirt is piled up the most within the excavation range. Thereafter, the determination unit 14 may determine the area where dirt is piled up the most as the excavation position. The determination unit 14 may also use information such as three-dimensional map data or three-dimensional image data to identify (i.e., determine) the area where the height of the dirt is higher than a predetermined threshold within the excavation range. Thereafter, the determination unit 14 may determine the area where the height of the dirt is higher than the predetermined threshold as the excavation position.

In addition, the determination unit 14 may use information such as three-dimensional map data or three-dimensional image data to determine the excavation position according to the height of the excavation device 20. For example, in some cases, the area where dirt is accumulated may have a pit shape. In this way, in the case where the level of the dirt accumulation area is lower than the ground level of the excavation device 20, the determination unit 14 may determine an area where dirt is piled up higher than the ground level of the excavation device 20 as the excavation position. Also, in the case where the level of the dirt accumulation area is the same as the ground level of the excavation device 20, the determination unit 14 may determine an area where dirt is piled up higher than a certain location on the excavation device 20 (such as a certain location in the operator's cab) as the excavation position.

The determination unit 14 may also use information such as three-dimensional map data or three-dimensional image data to determine the area closest to the excavation device 20 within the excavation range as the excavation position. Alternatively, the determination unit 14 may use information such as three-dimensional map data or three-dimensional image data to determine the area farthest away from the excavation device 20 within an excavation range where the excavation device 20 is capable of excavating without moving as the excavation position.

In addition, the determination unit 14 may use gradient data to determine the excavation position according to the gradient of dirt within the excavation range. For example, the determination unit 14 may determine the area having the steepest gradient within the excavation range as the excavation position.

The control device 10 transmits control information related to excavation operations of the excavation device 20 to the excavation device 20 (step S16). Specifically, the transmission unit 16 controls the transmission of control information related to excavation operations to the excavation device 20. At this time, the transmission unit 16 may also generate the control information related to excavation operations.

The excavation device 20 executes excavation operations according to the received control information (step S18). Specifically, the excavation device 20 causes a driving unit to operate in accordance with the control information. With this arrangement, the excavation device 20 excavates the determined excavation position. For example, in the case where the excavation device 20 is a hydraulic excavator, the excavation device 20 causes a crawler (motor) to operate so as to achieve a movement speed indicated by the control information. Additionally, the excavation device 20 causes components such as a slewing motor for moving a slewing body and hydraulic cylinders for moving an arm to operate such that a bucket moves on a movement path indicated by the control information. Note that the excavation operations are not limited to operations of excavating the object 80. For example, the excavation operations may also include operations for raising the arm, bucket, and the like in order to excavate the object 80, operations for turning the excavation device 20 in the direction of the excavation spot, operations for moving the excavation device 20 to the excavation spot, and operations for leveling the object 80 at the excavation spot. In other words, the excavation operations may be any operations performed for the purpose of excavating the object 80 at the excavation spot.

In this way, in the excavation system 1 according to the first example embodiment, the first detection device 2 is provided at the excavation spot. Consequently, compared to the case where a detection device such as a camera is installed on the excavation device 20, an excavation range that would be difficult to capture from the excavation device 20 can be detected appropriately. For this reason, the excavation position that should be excavated can be determined more appropriately. Therefore, the excavation system 1 according to the first example embodiment is capable of improving the work efficiency at an excavation site. Note that the control device 10 according to the first example embodiment may also be used to improve the work efficiency at an excavation site. Furthermore, a control method executed by the control device 10 and a program that executes the control method may also be used to improve the work efficiency at an excavation site.

Also, in the case where the control device 10 is provided in the excavation device 20, there may be limitations on the size of the control device 10 so as not to interfere with the operability of the excavation device 20 or the like. In contrast, by providing the control device 10 in a location away from the excavation device 20, the limitations on the size of the control device 10 are relaxed. With this arrangement, the control device 10 is capable of executing complex algorithms. Consequently, it is possible to control complex operations of the excavation device 20. Furthermore, by having the control device 10 to transmit control information to the excavation device 20 and having the excavation device 20 execute operations according to the control information, the number of man-hours worked by on-site workers can be reduced. The same also applies to the other example embodiments described hereinafter.

Second Example Embodiment

Next, the second example embodiment will be described with reference to the drawings. To clarify the explanation, the following description and drawings are abbreviated or simplified where appropriate. Also, in the drawings, like elements are denoted with like signs, and a duplicate description of such elements is omitted where appropriate. The system according to the second example embodiment differs from the first example embodiment by including a detection device that detects a loading spot 90.

Figure 3:
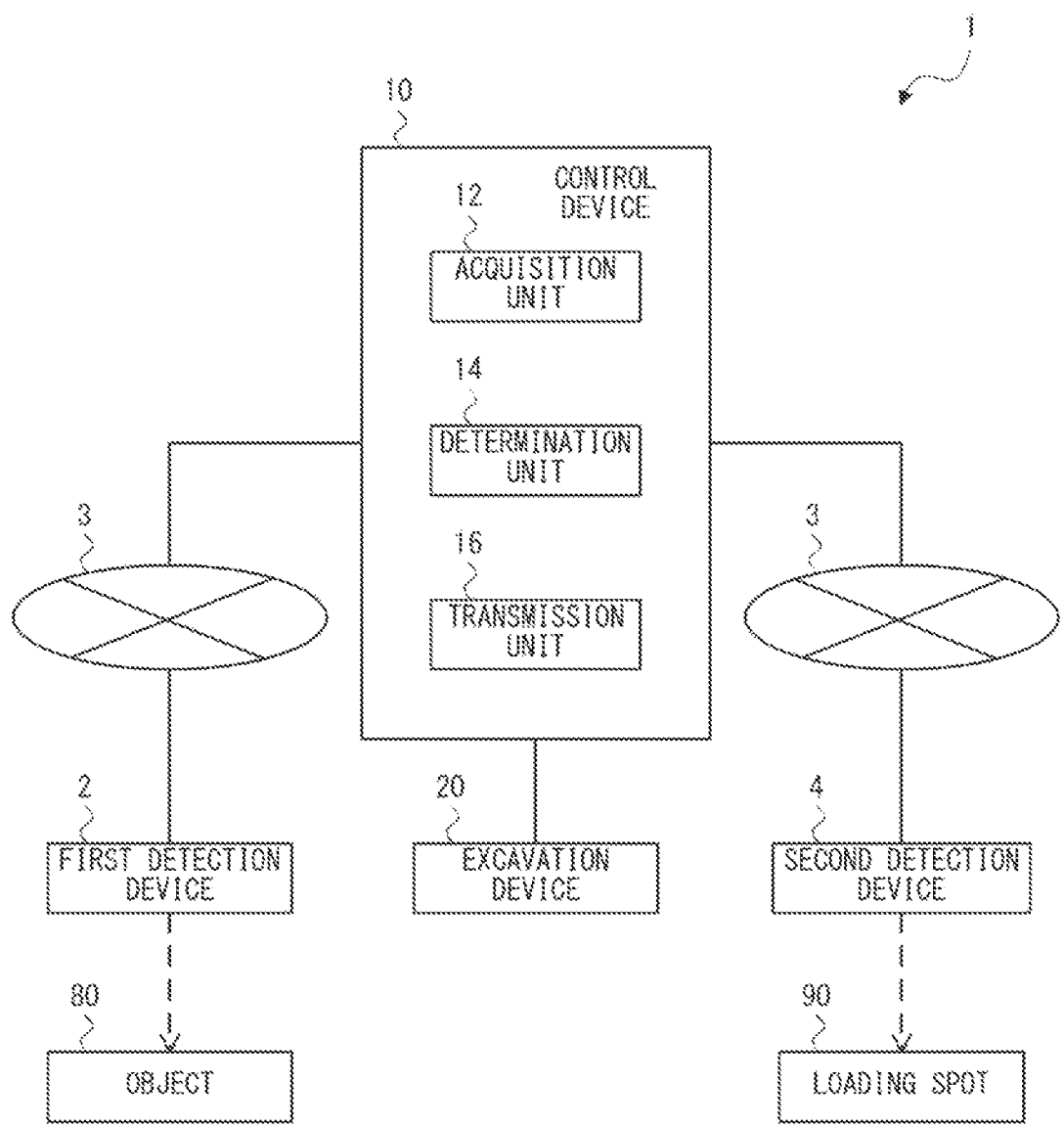
FIG. 3 is a diagram illustrating a configuration of an excavation system according to a second example embodiment.

FIG. 3 is a diagram illustrating a configuration of an excavation system 1 according to the second example embodiment. The excavation system 1 according to the second example embodiment includes a first detection device 2, a second detection device 4, an excavation device 20, and a control device 10. The control device 10 is communicably connected to the second detection device 4 through a network 3. In other words, the control device 10 has a wireless or wired connection to the second detection device 4. Note that because the first detection device 2, the control device 10, and the excavation device 20 are substantially the same as the first example embodiment, a description of them is omitted. Note that in FIG. 3, the control device 10 is illustrated distinctly from the excavation device 20, but as illustrated in FIG. 6 described later, the control device 10 may also be installed onboard the excavation device 20.

Note that in the second example embodiment, the excavation device 20 does not only excavate the object 80, but also loads the object 80 at a loading spot 90 where the excavated object 80 should be loaded. The loading spot 90 is a transport device (i.e., transport apparatus or transporter) that transports the object 80, such as a dump truck for example, but is not limited thereto. For example, the loading spot 90 may also be a section of the worksite different from the excavation spot.

The second detection device 4 (second detection device) is installed in a location away from the excavation device 20. The second detection device 4 detects information related to the loading spot 90 (loading spot information). Like the first detection device 2, the second detection device 4 is a three-dimensional sensor such as a 3D LiDAR sensor, a stereo camera, or a ToF camera, for example, but is not limited thereto.

The second detection device 4 is installed so as to be capable of monitoring the loading spot 90, for example. The second detection device 4 is installed above the loading spot 90, for example. With this arrangement, the second detection device 4 can detect the state of the loading spot 90. In other words, the second detection device 4 is installed at a position where the state of the loading spot 90 is detectable. Also, the "loading spot information" is information indicating the position of the loading spot 90, for example. For instance, in the case where the second detection device 4 is a 3D LiDAR sensor, the loading spot information may be three-dimensional coordinate information about the loading spot 90. Also, in the case where the second detection device 4 is a stereo camera, the loading spot information may be a three-dimensional captured image. However, the loading spot information is not limited to the above.

The control device 10 transmits to the excavation device 20 control information related to operations of the excavation device 20 determined on the basis of load data indicating the position of the object 80 loaded at the loading spot 90 acquired on the basis of the information related to the loading spot 90. In other words, the control device 10 transmits control information to the excavation device 20 on the basis of load data corresponding to the information related to the loading spot. The excavation device 20 executes operations for loading (loading operations) according to the control information. The loading operations are operations of loading the object 80 onto the loading spot 90, for example, but are not limited thereto as described later. Note that operations of the acquisition unit 12, the determination unit 14, and the transmission unit 16 according to the second example embodiment will be described later. Note that in the second example embodiment, the control device 10 (acquisition unit 12, determination unit 14, and transmission unit 16) may also perform substantially the same operations as the operations according to the first example embodiment. The control device 10 (acquisition unit 12, determination unit 14, and transmission unit 16) according to the second example embodiment may perform operations related to loading the object 80 in addition to the operations according to the first example embodiment.

Figure 4:
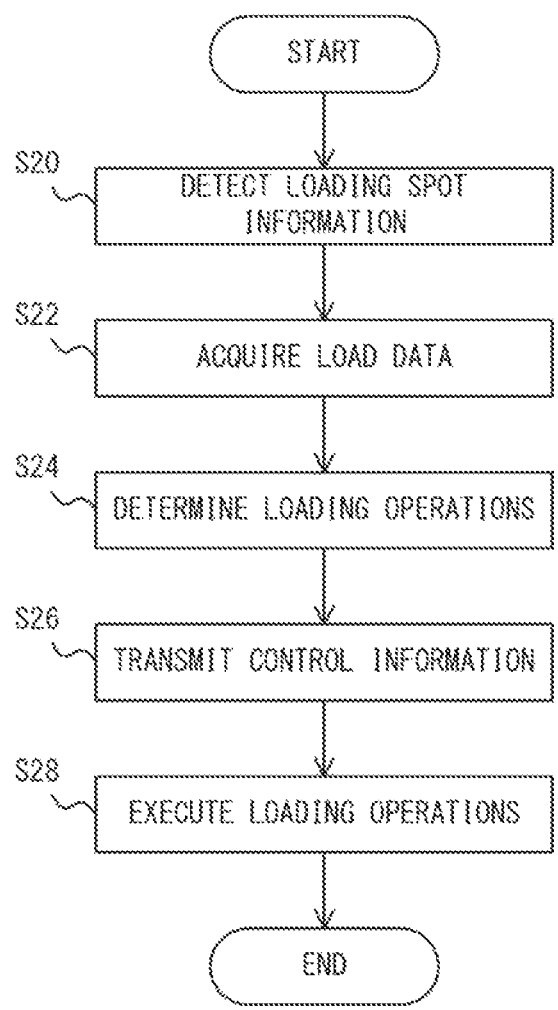
FIG. 4 is a flowchart illustrating a process executed by the excavation system according to the second example embodiment.

FIG. 4 is a flowchart illustrating a process executed by the excavation system 1 according to the second example embodiment. Note that FIG. 4 illustrates a control method (S22 to S26) executed by the control device 10 according to the second example embodiment. As described above, the second detection device 4 detects loading spot information (step S20).

The control device 10 acquires load data indicating the position of the object 80 loaded onto the loading spot 90 (step S22). Specifically, the acquisition unit 12 acquires load data. The acquisition unit 12 may also use the loading spot information to calculate the load data. Alternatively, the acquisition unit 12 may acquire (receive) load data from an intermediate control device (described later) that has calculated the load data using the loading spot information.

Here, the load data is data indicating the shape or the three-dimensional coordinate position of the dirt loaded onto the loading spot 90, for example. In other words, through the processing by the acquisition unit 12, the control device 10 can ascertain the shape of the object 80 such as dirt loaded onto the loading spot 90. For example, in the case where the second detection device 4 is a 3D LiDAR sensor, the load data may be three-dimensional map data in which a point cloud obtained by 3D LiDAR is plotted. Also, in the case where the second detection device 4 is a stereo camera, the load data may be three-dimensional image data. The load data may also be gradient data calculated geometrically from loading spot information (three-dimensional coordinate information) obtained from the second detection device 4. Gradient data indicates the gradient of the object 80 (such as dirt) at a certain position in the loading spot 90. Also, the load data may be data (dirt quantity data, for example) indicating the quantity (volume) of the object 80 at the loading spot 90 calculated geometrically from loading spot information (three-dimensional coordinate information) obtained from the second detection device 4. The dirt quantity data indicates the volume of dirt in a certain region of the loading spot 90.

The control device 10 determines operations of the excavation device 20 on the basis of the load data acquired by the acquisition unit 12 (step S24). Specifically, the determination unit 14 determines loading operations (such as release operations) by the excavation device 20 on the basis of the load data. Furthermore, for example, the determination unit 14 determines the position where the object 80 should be loaded onto the loading spot 90 (loading position) from the position and shape of the object 80 already loaded onto the loading spot 90. Moreover, the determination unit 14 determines how the excavation device 20 should operate to load (release) the object 80 onto the loading position (release position). In addition, the determination unit 14 may generate control information related to the determined operations. The control information is information (commands) for causing the excavation device 20 to execute specified operations. For example, in the case where the excavation device 20 is a hydraulic excavator, the control information may include information such as a movement path of a bucket to the loading position, the angles and angular speeds of the links and the like of an arm for achieving the movement path, and the movement speed of the excavation device 20.

Furthermore, the loading position may be determined according to various conditions. The conditions for determining the loading position may be any one or more selected by an administrator from among the conditions given as examples below. Alternatively, the determination unit 14 may appropriately modify the conditions given as examples below according to the loading situation.

The determination unit 14 may also use information such as three-dimensional map data or three-dimensional image data to identify the area where the height of the dirt is the lowest in the loading spot 90. Thereafter, the determination unit 14 may determine the area where the height of the dirt is the lowest as the loading position. The determination unit 14 may also use information such as three-dimensional map data or three-dimensional image data to identify (i.e., determine) the area where the height of the dirt is lower than a predetermined threshold in the loading spot 90. Thereafter, the determination unit 14 may determine the area where the height of the dirt is lower than the threshold as the loading position.

In addition, the determination unit 14 may use gradient data to determine the loading position according to the gradient of dirt in the loading spot 90. For example, the determination unit 14 may determine an area where the gradient is the shallowest or where the gradient is shallower than a predetermined threshold in the loading spot 90 as the loading position.

The determination unit 14 may also determine an area where there is little dirt in the loading spot 90 as the loading position. Note that the determination unit 14 may use information such as dirt quantity data to identify (i.e., determine) a region where the quantity of dirt is lower than a predetermined threshold or the region with the smallest quantity of dirt as the "area where there is little dirt".

The determination unit 14 may also use information such as three-dimensional map data or three-dimensional image data to determine an area at the front of the loading spot 90, namely a transport device, as the loading position. Alternatively, the determination unit 14 may use information such as three-dimensional map data or three-dimensional image data to determine an area in the center of the loading spot 90, namely a transport device, as the loading position. Note that the "front" and the "center" of the transport device may be predetermined respectively to correspond to certain regions on the bed (vessel) of the transport device.

Also, in the case where a plurality of loading spots 90 exist at the worksite, the determination unit 14 may use dirt quantity data to determine the loading spot 90 with the smallest quantity of dirt as the loading position. Alternatively, in the case where a plurality of transport devices acting as loading spots 90 exist at the worksite, the determination unit 14 may use dirt quantity data to determine the loading spot 90 with the largest quantity of dirt as the loading position. With this arrangement, the transport devices can be filled up with dirt quickly and quickly proceed to the step of transporting the dirt out of the worksite.

Note that the determination unit 14 may also determine operations other than release operations as the loading operations. For example, the determination unit 14 may also determine leveling operations to be performed. Specifically, the determination unit 14 may use gradient data to determine the area with the steepest gradient in the loading spot 90 or an area where the gradient is steeper than a predetermined threshold as an area of dirt to be leveled. The loading operations include operations for raising the excavated object 80 such as dirt, operations for turning the excavation device 20 in the direction of the loading spot 90, and operations for moving the excavation device 20 to the loading spot 90, for example. Furthermore, the loading operations include operations for placing the object 80 in the loading spot 90 (operations for lowering and releasing the raised object 80) and operations of which the excavation device 20 tamps down the dirt in the loading spot 90 to keep the dirt from piling up past a certain height, for example. In other words, the "loading operations" are operations performed for the purpose of loading the object 80 onto the loading spot 90, and may be any operations performed on the object 80 at the loading spot 90.

The control device 10 transmits control information related to loading operations of the excavation device 20 to the excavation device 20 (step S26). Specifically, the transmission unit 16 controls the transmission of control information related to loading operations to the excavation device 20. At this time, the transmission unit 16 may also generate the control information related to loading operations.

The excavation device 20 executes loading operations according to the received control information (step S28). Specifically, the excavation device 20 causes a driving unit to operate in accordance with the control information. With this arrangement, the excavation device 20 loads (releases) the object 80 at the determined loading position. For example, in the case where the excavation device 20 is a hydraulic excavator, the excavation device 20 causes a crawler to operate so as to achieve a movement speed indicated by the control information. Additionally, the excavation device 20 causes components such as a slewing motor and hydraulic cylinders to operate such that a bucket moves on a movement path indicated by the control information.

In this way, in the excavation system 1 according to the second example embodiment, the second detection device 4 is provided at the loading spot 90. Consequently, compared to the case where a detection device such as a camera is installed on the excavation device 20, a loading spot 90 that would be difficult to capture from the excavation device 20 can be detected appropriately. For this reason, the loading position where the object 80 should be loaded can be determined more appropriately. Therefore, the excavation system 1 according to the second example embodiment is capable of further improving the work efficiency at an excavation site. Note that the control device 10 according to the second example embodiment may also be used to further improve the work efficiency at an excavation site. Furthermore, a control method executed by the control device 10 and a program that executes the control method may also be used to further improve the work efficiency at an excavation site.

In addition, the excavation system 1 according to the second example embodiment is configured to use a plurality of detection devices to control operations of the excavation device 20. Specifically, in the second example embodiment, by using the first detection device 2 and the second detection device 4, both the excavation position and the loading position can be identified (i.e., determined). With this arrangement, more precise control of the excavation device 20 can be achieved. In other words, excavation operations and loading operations of the excavation device 20 can be controlled as a series of operations. In this case, the control information may also include data indicating excavation operations and loading operations.

Third Example Embodiment

Next, the third example embodiment will be described with reference to the drawings. To clarify the explanation, the following description and drawings are abbreviated or simplified where appropriate. Also, in the drawings, like elements are denoted with like signs, and a duplicate description of such elements is omitted where appropriate. The system according to the third example embodiment differs from the other example embodiments described above by including a detection device that detects the attitude of the excavation device.

Figure 5:
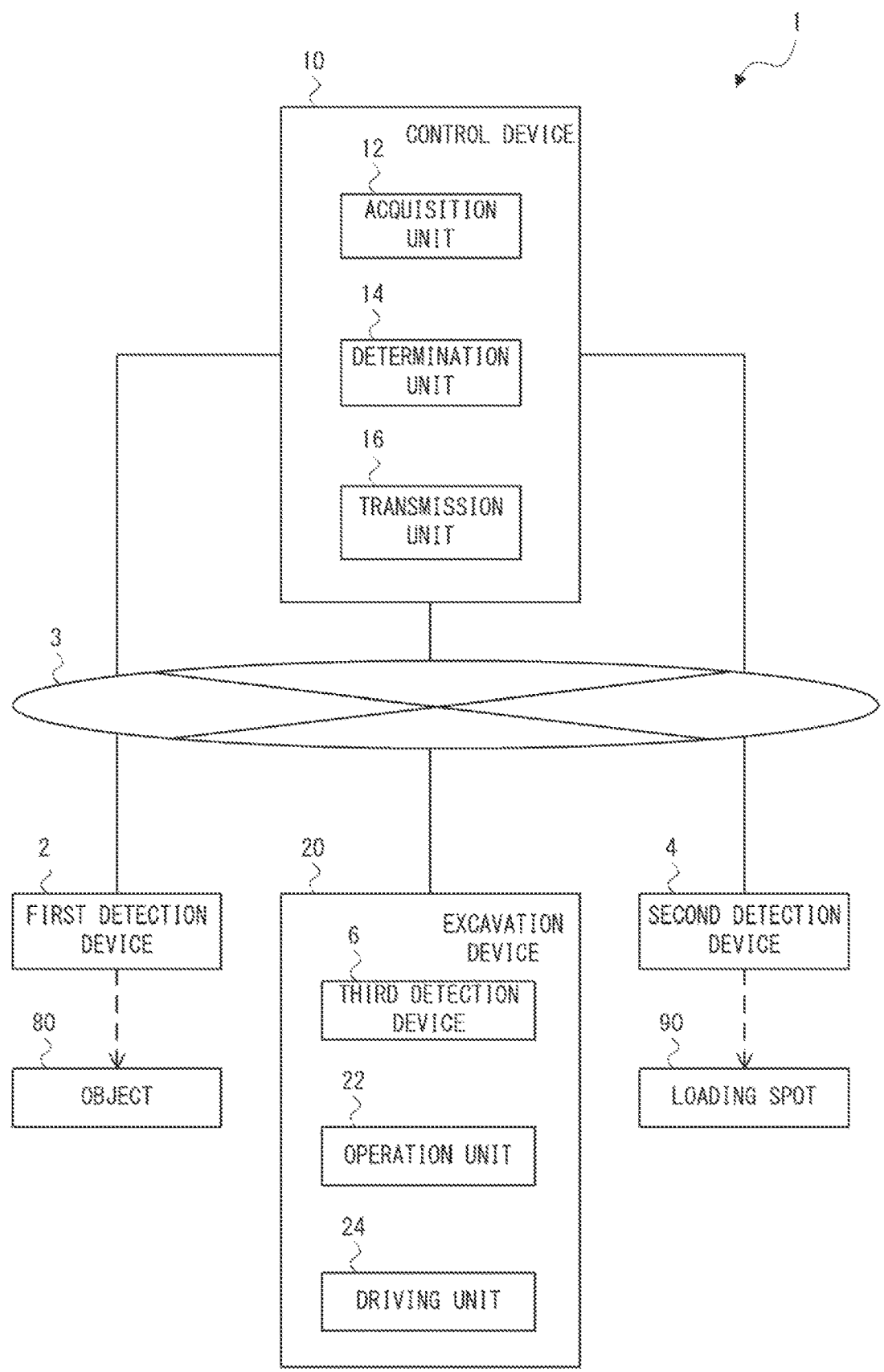
FIG. 5 is a diagram illustrating a configuration of an excavation system according to a third example embodiment.

FIGS. 5 and 6 are diagrams illustrating a configuration of an excavation system 1 according to the third example embodiment. The excavation system 1 according to the third example embodiment includes a first detection device 2, a second detection device 4, a third detection device 6, an excavation device 20, and a control device 10.

FIG. 5 illustrates an example in which the control device 10 is provided outside the excavation device 20. In this case, the control device 10 is communicably connected to the third detection device 6 through a network 3. In other words, the control device 10 has a wireless or wired connection to the third detection device 6. On the other hand, FIG. 6 illustrates an example in which the control device 10 is provided inside the excavation device 20. In this case, the control device 10 is communicably connected to the third detection device 6 by a wire such as a cable.

Note that because the first detection device 2, the second detection device 4, and the control device 10 are substantially the same as the other example embodiments described above, a description of them is omitted. Note that in FIGS. 5 and 6, the excavation system 1 includes the second detection device 4, but the excavation system 1 according to the third example embodiment does not have to include the second detection device 4.

The third detection device 6 (third detection device) detects information related to the state of the excavation device 20 (excavation device information). The third detection device 6 is an attitude sensor, a position detection device, a direction sensor, a three-dimensional sensor, and the like, but is not limited thereto. Note that in FIGS. 5 and 6, the third detection device 6 is illustrated as being provided in the excavation device 20, but the third detection device 6 does not have to be installed in the excavation device 20.

The excavation device 20 includes an operation unit 22 and a driving unit 24. The operation unit 22 is a member that operates in order for the excavation device 20 to perform work. For example, the operation unit 22 is a crawler, a bucket, a slewing body, a boom, and an arm. The driving unit 24 is equipment that drives the operation unit 22. For example, the driving unit 24 is an engine, a hydraulic cylinder, and a motor.

The control device 10 transmits to the excavation device 20 control information related to operations of the excavation device 20 determined on the basis of the attitude of the excavation device 20 acquired on the basis of the information related to the state of the excavation device 20. In other words, the control device 10 transmits control information to the excavation device 20 on the basis of device data (i.e., apparatus data or machine data) indicating the state of the excavation device 20 corresponding to the information related to the state of the excavation device 20. The excavation device 20 executes excavation operations or loading operations in accordance with the control information. Note that operations of the acquisition unit 12, the determination unit 14, and the transmission unit 16 according to the third example embodiment will be described later. Note that in the third example embodiment, the control device 10 (acquisition unit 12, determination unit 14, and transmission unit 16)

may also perform substantially the same operations as the operations according to the example embodiments described above.

Figure 7:
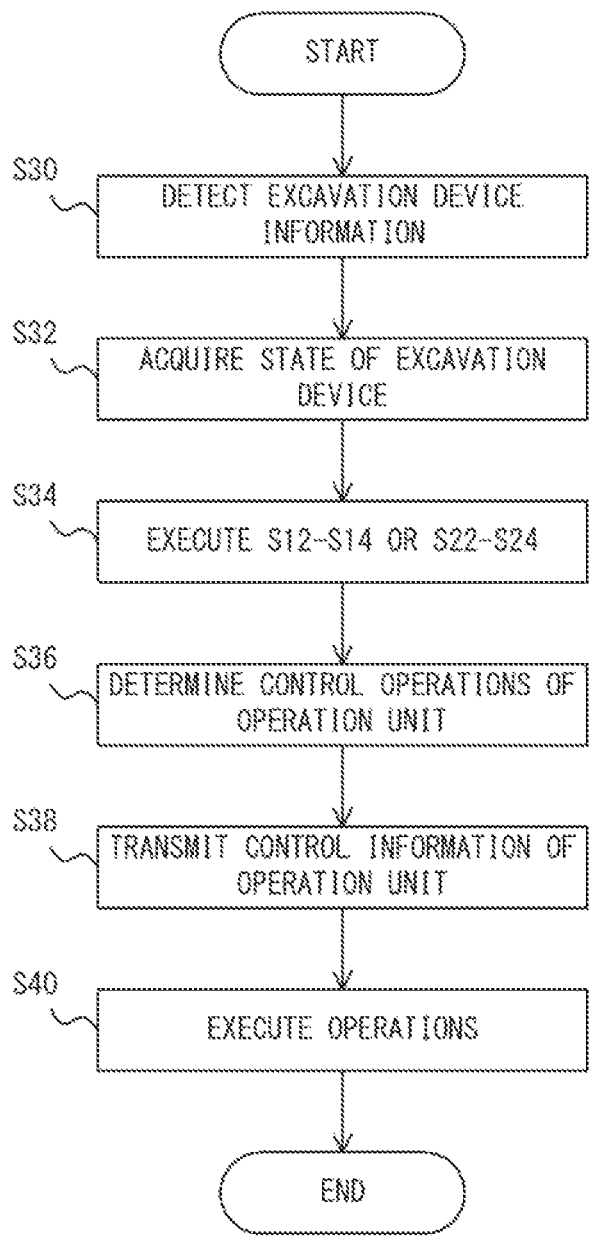
FIG. 7 is a flowchart illustrating a process executed by the excavation system according to the third example embodiment.

FIG. 7 is a flowchart illustrating a process executed by the excavation system 1 according to the third example embodiment. Note that FIG. 7 illustrates a control method (S32 to S38) executed by the control device 10 according to the third example embodiment. As described above, the third detection device 6 detects excavation device information (step S30).

The control device 10 acquires device data, which is data indicating the current state of the excavation device 20 (step S32). Specifically, the acquisition unit 12 acquires device data. The acquisition unit 12 may also use the excavation device information to calculate the device data. Alternatively, the acquisition unit 12 may acquire (receive) device data from an intermediate control device (described later) that has calculated the device data using the excavation device information.

Here, the device data is information indicating the current attitude, direction, and position of the excavation device 20 and the operation unit 22, for example. For example, the device data may indicate a state in which the arm is extended, and the bucket is away from the main body of the excavation device 20. The device data may also indicate a state in which the boom is extended upward, and the bucket is in a high position.

The control device 10 executes the process from S12 to S14 illustrated in FIG. 2 or the process from S22 to S24 illustrated in FIG. 4 (step S34). Additionally, the control device 10 determines control operations of the operation unit 22 on the basis of the device data (step S36). Specifically, on the basis of the device data, the determination unit 14 determines operations of the operation unit 22 to execute the excavation operations or loading operations determined in the process of S34. In addition, the determination unit 14 may generate control information related to the determined operations. The control information is information (commands) for causing the excavation device 20 to execute specified operations. For example, in the case where the excavation device 20 is a hydraulic excavator, the control information may include information such as a movement path of a bucket to an excavation position or a loading position, the turning angle and turning angular velocity of a slewing body, the angles and angular speeds of the links and the like of an arm for achieving the movement path, and the movement speed of the excavation device 20.

For example, in the case where the device data indicates a state in which the distance in the horizontal direction from the main body of the excavation device 20 to the bucket is farther than a predetermined threshold, the determination unit 14 may determine operations such that the bucket is brought close to the main body of the excavation device 20 before causing the slewing body to turn. This arrangement makes it possible to keep the arm or the bucket from colliding with objects near the excavation device 20 when the slewing body turns.

The control device 10 transmits control information related to operations of the operation unit 22 of the excavation device 20 to the excavation device 20 (step S38). Specifically, the transmission unit 16 controls the transmission of control information related to operations of the operation unit 22 of the excavation device 20 to the excavation device 20. At this time, the transmission unit 16 may also generate the control information related to operations of the operation unit 22 of the excavation device 20.

The excavation device 20 executes operations according to the received control information (step S40). Specifically, the excavation device 20 causes the driving unit 24 to operate in accordance with the control information. With this arrangement, the operation unit 22 of the excavation device 20 executes the determined operations. For example, in the case of bringing the bucket close to the main body of the excavation device 20 before causing the slewing body to turn and perform excavation operations, first, the excavation device 20 controls the hydraulic cylinders for driving the arm to cause the arm to bend with respect to the boom. Thereafter, the excavation device 20 controls a motor for driving the slewing body to turn the slewing body so that the bucket faces the excavation spot. In addition, the excavation device 20 controls the hydraulic cylinders for driving the boom and the arm to move the bucket to the excavation position.

In this way, the excavation system 1 according to the third example embodiment includes the third detection device 6 that detects excavation device information. For this reason, the excavation device 20 can perform operations depending on the current attitude. Consequently, the excavation device 20 can perform operations efficiently. Therefore, the excavation system 1 according to the third example embodiment is capable of further improving the work efficiency at an excavation site. Note that the control device 10 according to the third example embodiment may also be used to improve the work efficiency at an excavation site. Furthermore, a control method executed by the control device 10 and a program that executes the control method may also be used to improve the work efficiency at an excavation site.

Fourth Example Embodiment

Next, the fourth example embodiment will be described with reference to the drawings. To clarify the explanation, the following description and drawings are abbreviated or simplified where appropriate. Also, in the drawings, like elements are denoted with like signs, and a duplicate description of such elements is omitted where appropriate. The fourth example embodiment corresponds to a more specific configuration of the example embodiments described above. Specifically, the system according to the fourth example embodiment differs from the other example embodiments described above by including an intermediate control device. Note that the fourth example embodiment illustrates an example in which the object 80 is dirt.

Figure 8:
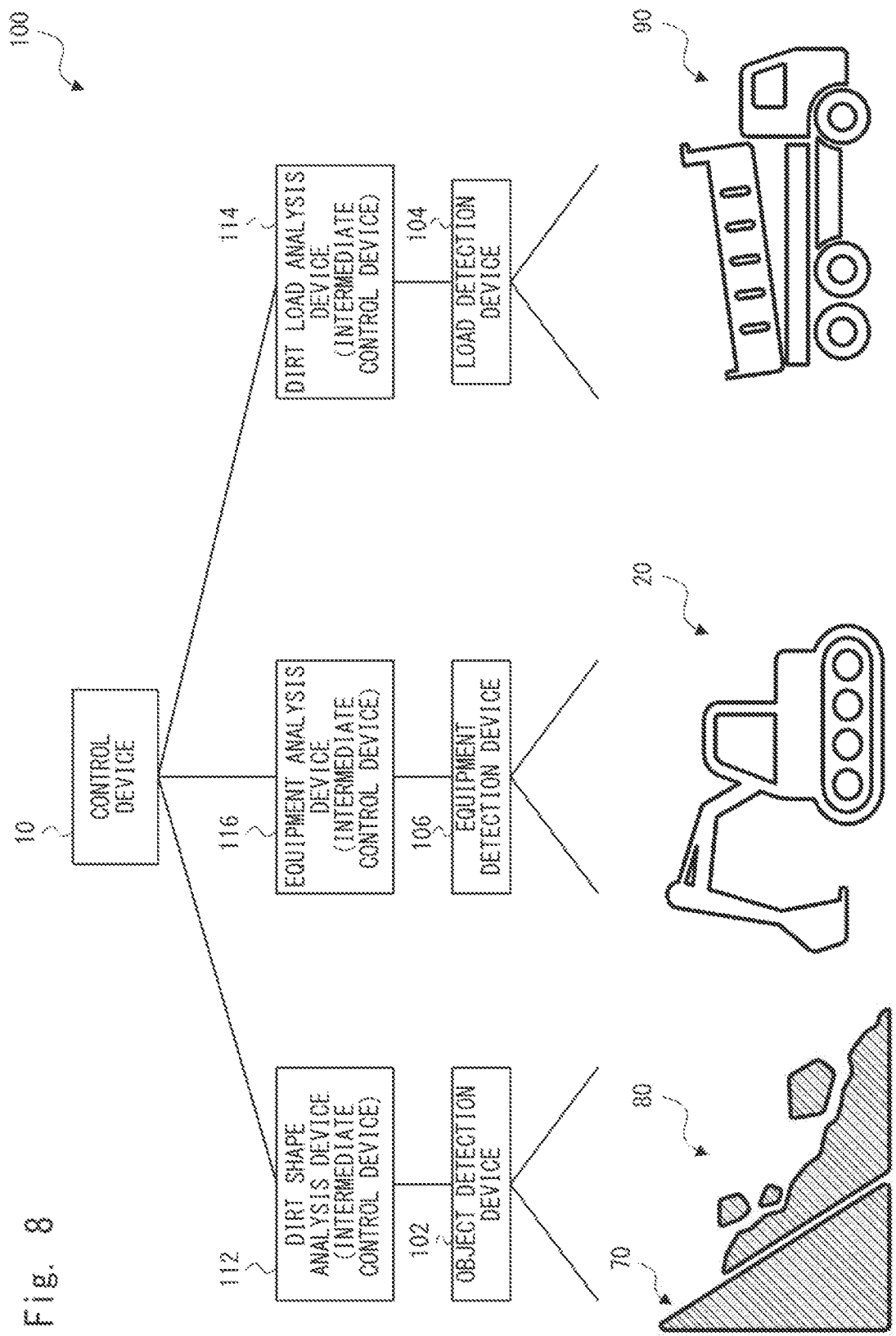
FIG. 8 is a diagram illustrating a configuration of an excavation system according to a fourth example embodiment.

FIG. 8 is a diagram illustrating a configuration of an excavation system 100 according to the fourth example embodiment. The excavation system 100 according to the fourth example embodiment includes a control device 10, an excavation device 20, an object detection device 102, a load detection device 104, and an equipment detection device 106. Additionally, the excavation system 100 according to the fourth example embodiment includes a dirt shape analysis device 112, a dirt load analysis device 114, and an equipment analysis device 116.

The object detection device 102 corresponds to the first detection device 2. The object detection device 102 is installed so as to be capable of monitoring the object 80 at an excavation spot 70, for example. The object detection device 102 is installed above the excavation spot 70, for example. The object detection device 102 detects information (object information) related to the object 80 at the excavation spot 70. More specifically, the object detection device 102 detects information indicating the position of the object 80 at the excavation spot 70. The object detection device 102 is a three-dimensional sensor such as a 3D LiDAR sensor, a stereo camera, or a ToF camera, for example.

The load detection device 104 corresponds to the second detection device 4. The load detection device 104 is installed so as to be capable of monitoring the loading spot 90, for example. The load detection device 104 is installed above the loading spot 90, for example. The load detection device 104 detects information related to the loading spot 90 (loading spot information). More specifically, the load detection device 104 detects information indicating the position of the object 80 at the loading spot 90. The load detection device 104 is a three-dimensional sensor such as a 3D LiDAR sensor, a stereo camera, or a ToF camera, for example.

The equipment detection device 106 (i.e., constructing machine detection device or machine detection device) corresponds to the third detection device 6. The equipment detection device 106 includes an attitude sensor, a position detection device, a direction sensor, and a three-dimensional sensor. The equipment detection device 106 detects information related to the attitude and position of the excavation device 20 (excavation device information).

The attitude sensor detects the attitude of the operation unit 22. The attitude sensor is a sensor such as an inclination sensor, a gyro sensor, a stroke sensor, an angle sensor, or a force sensor, for example. The inclination sensor and the gyro sensor may be installed on the operation unit 22 such as the bucket, arm, and boom, for example. The stroke sensor may be installed on the hydraulic cylinders or the like, for example. The angle sensor and the force sensor may be installed between components of the operation unit 22, such as at the joint between the main body and the boom, at the joint between the boom and the arm, at the joint between the arm and the bucket, or in the motor that causes the slewing body to turn.

The direction sensor detects which direction the excavation device 20 is facing. The direction sensor is a global navigation satellite system (GNSS) device, a gyro sensor, or a linear encoder, for example. The direction sensor may be installed in the main body of the excavation device 20, for example. The position detection device detects the positional coordinates of the excavation device 20 and the operation unit 22. The position detection device is a GNSS device, a 3D LiDAR sensor, or a stereo camera, for example.

The dirt shape analysis device 112, the dirt load analysis device 114, and the equipment analysis device 116 are each an intermediate control device. The intermediate control device is a computer. The intermediate control device is an edge server, for example. The intermediate control device is installed near the worksite. In other words, the dirt shape analysis device 112 may be installed near the object detection device 102. The dirt load analysis device 114 may be installed near the load detection device 104. The equipment analysis device 116 (i.e., constructing machine analysis device or machine analysis device) may be installed near the equipment detection device 106, or in other words, near the excavation device 20 or in the excavation device 20. Note that the intermediate control device is also applicable to the excavation system according to the other example embodiments.

The intermediate control device is communicably connected to the control device 10 through a network 3. The dirt shape analysis device 112 is communicably connected to the object detection device 102. The dirt load analysis device 114 is communicably connected to the load detection device 104. The equipment analysis device 116 is communicably connected to the equipment detection device 106. Operations of the intermediate control device will be described later.

Figure 9:
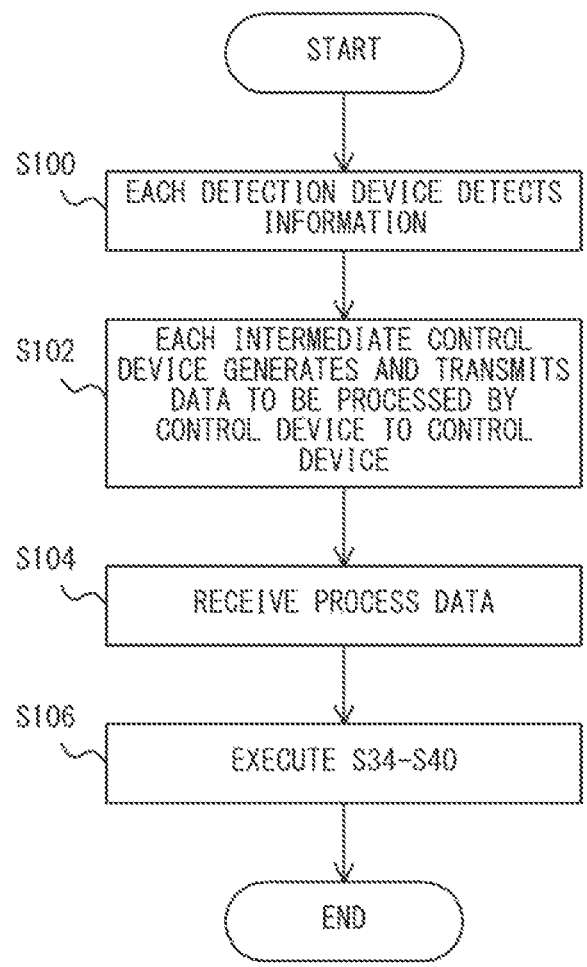
FIG. 9 is a flowchart illustrating a process executed by the excavation system according to the fourth example embodiment.

FIG. 9 is a flowchart illustrating a process executed by the excavation system 100 according to the fourth example embodiment. Note that in the following, the object information, loading spot information, and excavation device information detected by each of the detection devices (object detection device 102, load detection device 104, and equipment detection device 106) are collectively referred to as the detection information.

First, each detection device detects the detection information (step S100). Specifically, as described above, the object detection device 102 detects the object information. The load detection device 104 detects the loading spot information. The equipment detection device 106 detects the excavation device information.

Next, each intermediate control device generates process data to be processed by the control device 10, and transmits the process data to the control device 10 (step S102). Hereinafter, operations of the dirt shape analysis device 112, the dirt load analysis device 114, and the equipment analysis device 116 will be described.

The dirt shape analysis device 112 acquires (receives) the object information from the object detection device 102. The dirt shape analysis device 112 uses the object information to analyze the shape of the dirt (object 80) at the excavation spot 70. Thereafter, the dirt shape analysis device 112 calculates (generates) target location data in a manner similar to the process of S12 described above. Here, the target location data is process data to be processed by the control device 10. The dirt shape analysis device 112 transmits the target location data to the control device 10.

The dirt load analysis device 114 acquires (receives) loading spot information from the load detection device 104. The dirt load analysis device 114 uses the loading spot information to analyze the shape of the dirt (object 80) at the loading spot 90. Thereafter, the dirt load analysis device 114 calculates (generates) load data in a manner similar to the process of S22 described above. Here, the load data is process data to be processed by the control device 10. The dirt load analysis device 114 transmits the load data to the control device 10.

The equipment analysis device 116 acquires (receives) the excavation device information from the equipment detection device 106. The equipment analysis device 116 uses the excavation device information to analyze the state, such as the attitude, of the excavation device 20. Thereafter, the equipment analysis device 116 calculates (generates) device data in a manner similar to the process of S32 described above. Here, the device data is process data to be processed by the control device 10. The equipment analysis device 116 transmits the device data to the control device 10.

The control device 10 receives the process data (target location data, load data, or device data) from the intermediate control devices (step S104). Thereafter, the process from S34 to S40 illustrated in FIG. 7 is executed (step S106). For example, in the case of receiving target location data and device data, the control device 10 uses the target location data to determine the excavation position (S14). In addition, the control device 10 determines control operations of the operation unit 22 from the determined excavation position and the device data (S36). Next, the control device 10 transmits the control information to the excavation device 20 (S38), and the excavation device 20 executes excavation operations (S40). The case where the control device 10 receives load data and device data is similar.

In this way, the excavation system 100 according to the fourth example embodiment includes an intermediate control device between each detection device and the control device 10. With this arrangement, the processing load is distributed between the intermediate control device and the control device 10, and the control device 10 does not have to generate the process data. Consequently, it is possible to reduce the processing load on the control device 10.

Figure 10:
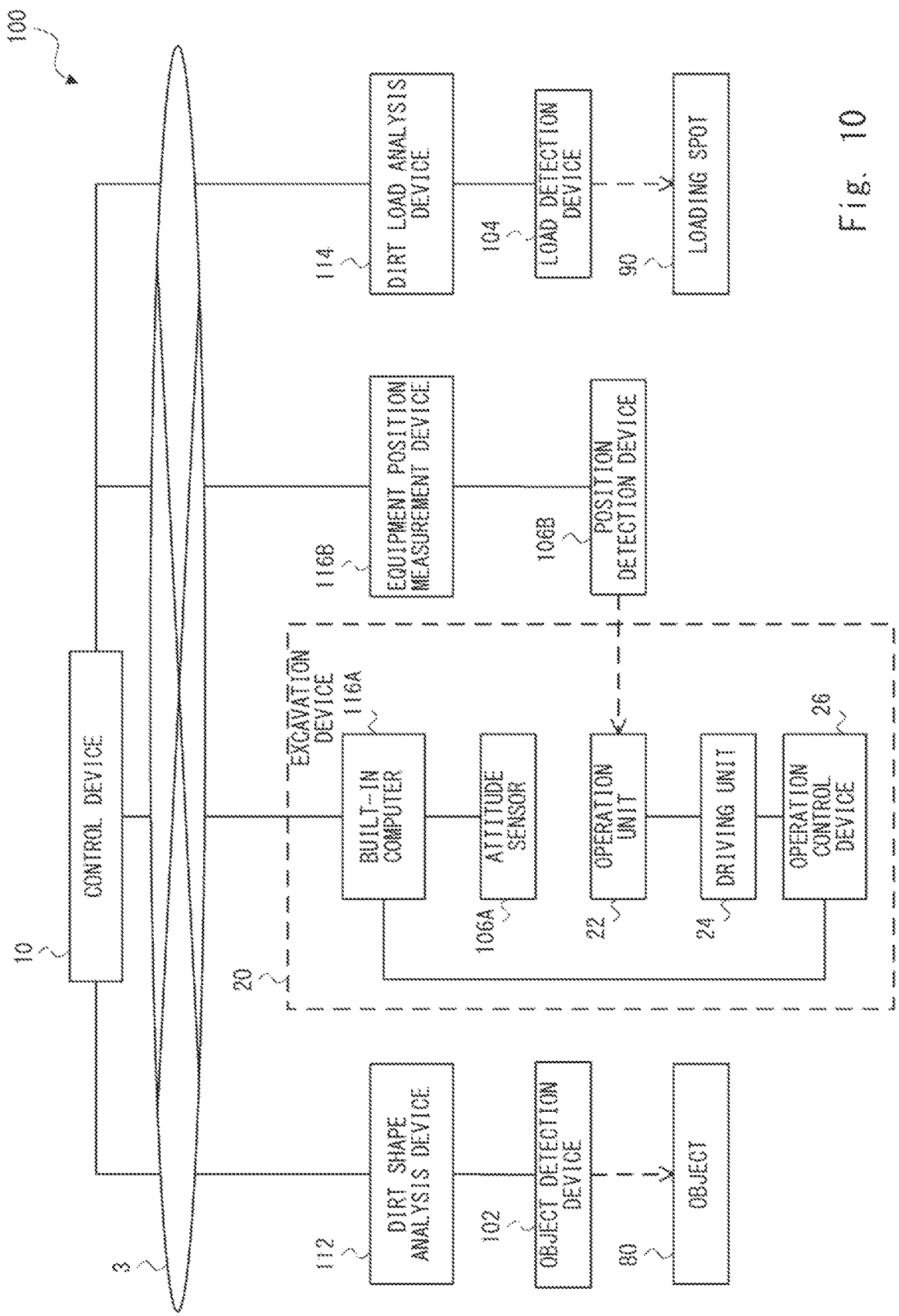
FIG. 10 is a diagram illustrating an example of a specific system configuration of the excavation system according to the fourth example embodiment.
Figure 11:
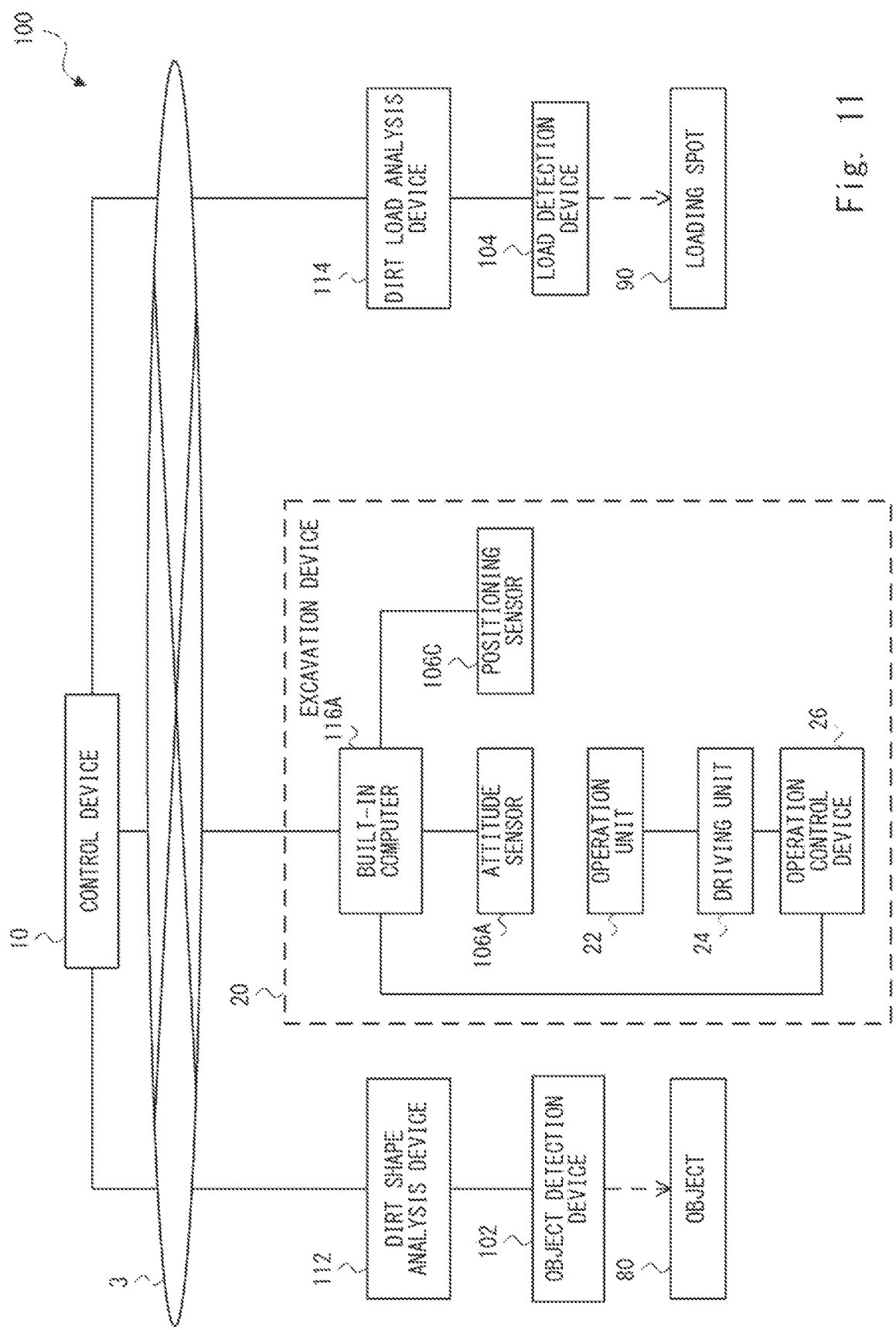
FIG. 11 is a diagram illustrating an example of a specific system configuration of the excavation system according to the fourth example embodiment.
Figure 12:
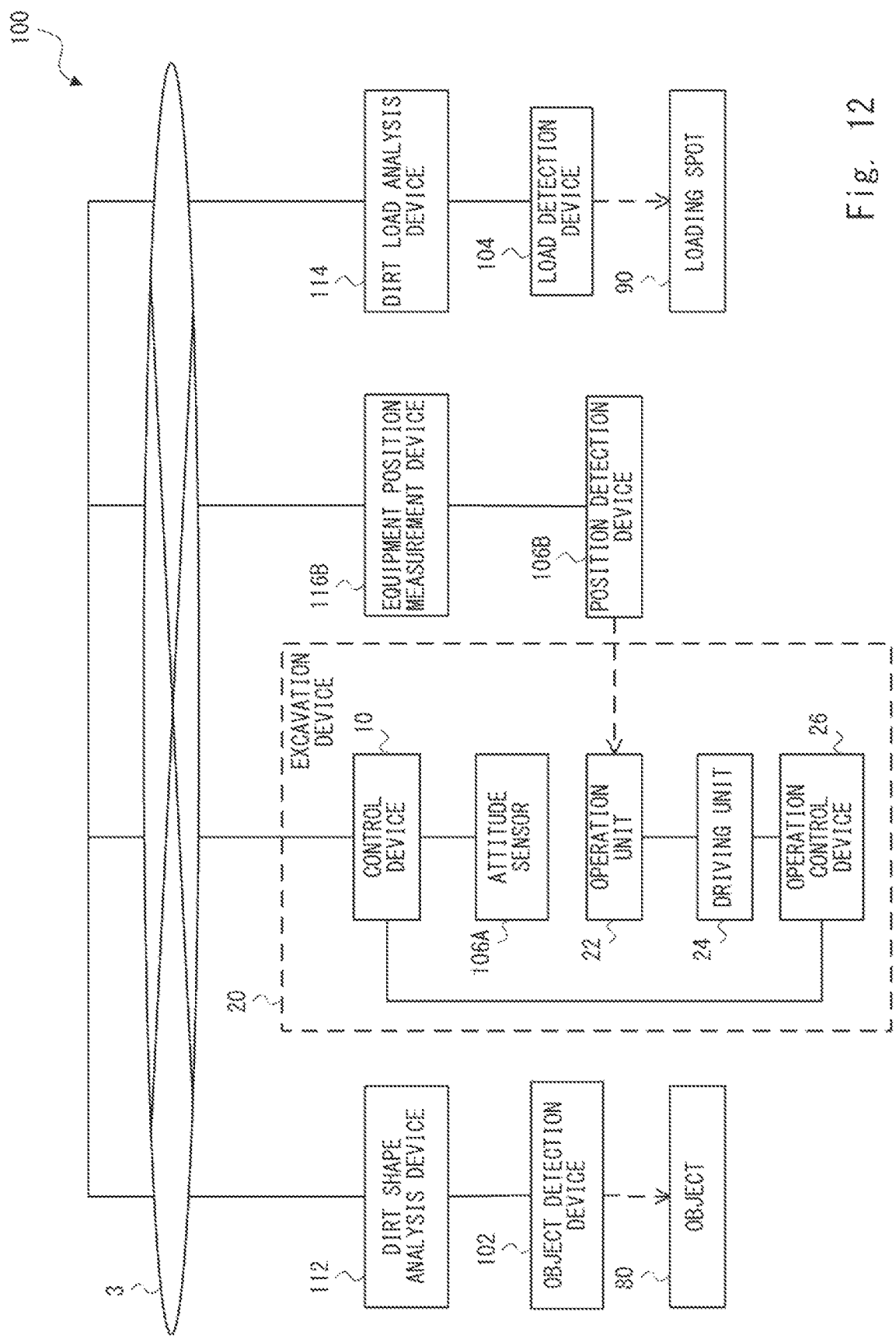
FIG. 12 is a diagram illustrating an example of a specific system configuration of the excavation system according to the fourth example embodiment.

FIGS. 10 to 12 are diagrams illustrating examples of specific system configurations of the excavation system 100 according to the fourth example embodiment.

FIG. 10 illustrates an example of detecting the position of the excavation device 20 from outside the excavation device 20. The excavation device 20 illustrated in FIG. 10 includes an operation unit 22, a driving unit 24, an operation control device 26, an attitude sensor 106A, and a built-in computer 116A. The operation control device 26, the attitude sensor 106A, and the built-in computer 116A will be described later.

The excavation system 100 illustrated in FIG. 10 includes an attitude sensor 106A and a position detection device 106B as the equipment detection device 106. The attitude sensor 106A is installed in the operation unit 22 or the like of the excavation device 20. On the other hand, the position detection device 106B is installed outside the excavation device 20 (at a position with an overhead view of the entire worksite, for example). The attitude sensor 106A detects the attitude of the operation unit 22 of the excavation device 20. The position detection device 106B detects the positional coordinates of the operation unit 22 of the excavation device 20, for example.

The excavation system 100 illustrated in FIG. 10 includes a built-in computer 116A and an equipment position measurement device 116B as the equipment analysis device 116. The built-in computer 116A is a computer onboard the excavation device or a computer built into the excavation device 20. The built-in computer 116A is communicably connected to the attitude sensor 106A. The built-in computer 116A is also communicably connected to the control device 10 through the network 3.

The equipment position measurement device 116B (i.e., constructing machine position measurement device or machine position measurement device) is installed near the position detection device 106B. The equipment position measurement device 116B is communicably connected to the position detection device 106B. The equipment position measurement device 116B is also communicably connected to the control device 10 through the network 3.

The built-in computer 116A receives detection information (excavation device information) indicating the attitude of the operation unit 22 from the attitude sensor 106A. The built-in computer 116A uses the information to analyze the attitude of the operation unit 22 of the excavation device 20. Thereafter, the built-in computer 116A calculates (generates) device data indicating the attitude of the operation unit 22 in a manner similar to the process of S32 described above. The built-in computer 116A transmits the device data indicating the attitude of the operation unit 22 to the control device 10.

The equipment position measurement device 116B receives detection information (excavation device information) indicating the positional coordinates of the operation unit 22 of the excavation device 20 from the position detection device 106B. Thereafter, the equipment position measurement device 116B calculates (generates) device data indicating the position of the excavation device 20 in a manner similar to the process of S32 described above. The equipment position measurement device 116B transmits the device data indicating the position of the excavation device 20 to the control device 10.

The control device 10 receives the device data (process data) from the built-in computer 116A and the equipment position measurement device 116B. Thereafter, the control device 10 determines control operations of the operation unit 22 on the basis of the device data (process data) in a manner similar to the process of S106 described above. The control device 10 transmits control information indicating the determined control operations to the built-in computer 116A of the excavation device 20. The built-in computer 116A controls the operation control device 26 in accordance with the control information.

The operation control device 26 (i.e., operation control apparatus) is a device that controls the driving unit 24 to cause the operation unit 22 to operate. Under the control by the operation control device 26, the operation unit 22 performs the operations determined by the control device 10. For example, the operation control device 26 may be attached to an operating lever in the operator's cab of the excavation device 20, and operate the operating lever. As another example, the operation control device 26 may also be a mechanism that causes the driving unit 24 to operate by transmitting a control signal to the driving unit 24.

FIG. 11 illustrates an example of detecting the position of the excavation device 20 with an internal detection device (sensor) of the excavation device 20. The excavation device 20 illustrated in FIG. 11 includes an operation unit 22, a driving unit 24, an operation control device 26, an attitude sensor 106A, a positioning sensor 106C, and a built-in computer 116A. The positioning sensor 106C will be described later.

The excavation system 100 illustrated in FIG. 11 includes the attitude sensor 106A and the positioning sensor 106C as the equipment detection device 106. The positioning sensor 106C is built into the excavation device 20. The positioning sensor 106C is communicably connected to the built-in computer 116A. The positioning sensor 106C is a GNSS device, for example. The positioning sensor 106C detects positional coordinates (such as the latitude and longitude) of the excavation device 20.

The excavation system 100 illustrated in FIG. 11 includes a built-in computer 116A as the equipment analysis device 116. The built-in computer 116A receives detection information (excavation device information) indicating the attitude of the operation unit 22 from the attitude sensor 106A. Also, the built-in computer 116A receives detection information (excavation device information) indicating the positional coordinates of the excavation device 20 from the positioning sensor 106C. Thereafter, the built-in computer 116A calculates (generates) device data indicating the attitude of the operation unit 22 and the position of the excavation device 20 in a manner similar to the process of S32 described above. The built-in computer 116A transmits the device data to the control device 10. The process thereafter is substantially the same as the process in the system illustrated in FIG. 10.

FIG. 12 illustrates an example in which the control device 10 is built into the excavation device 20. The excavation device 20 illustrated in FIG. 12 includes a control device 10, an operation unit 22, a driving unit 24, an operation control device 26, and an attitude sensor 106A. The excavation system 100 illustrated in FIG. 12 includes the control device 10 and an equipment position measurement device 116B as the equipment analysis device 116. In other words, the control device 10 includes at least a portion of the functions of the equipment analysis device 116. The rest of the configuration is substantially the same as the configuration illustrated in FIG. 10.

The control device 10 is communicably connected to the dirt shape analysis device 112, the equipment position measurement device 116B, and the dirt load analysis device 114 through a network 3. The control device 10 may perform substantially the same process as the built-in computer 116A. In other words, the control device 10 receives detection information (excavation device information) indicating the attitude of the operation unit 22 from the attitude sensor 106A. The control device 10 uses the information to analyze the attitude of the operation unit 22 of the excavation device 20. Thereafter, the control device 10 calculates (generates) device data indicating the attitude of the operation unit 22 in a manner similar to the process of S32 described above. Other processes by the control device 10 are substantially the same as the processes illustrated in FIG. 10.

Fifth Example Embodiment

Next, the fifth example embodiment will be described with reference to the drawings. To clarify the explanation, the following description and drawings are abbreviated or simplified where appropriate. Also, in the drawings, like elements are denoted with like signs, and a duplicate description of such elements is omitted where appropriate. The fifth example embodiment corresponds to a more specific configuration of the first to third example embodiments described above. The fifth example embodiment differs from the other example embodiments described above in that the control device 10 controls the excavation device 20 and a device (first device) other than the excavation device 20.

Figure 13:
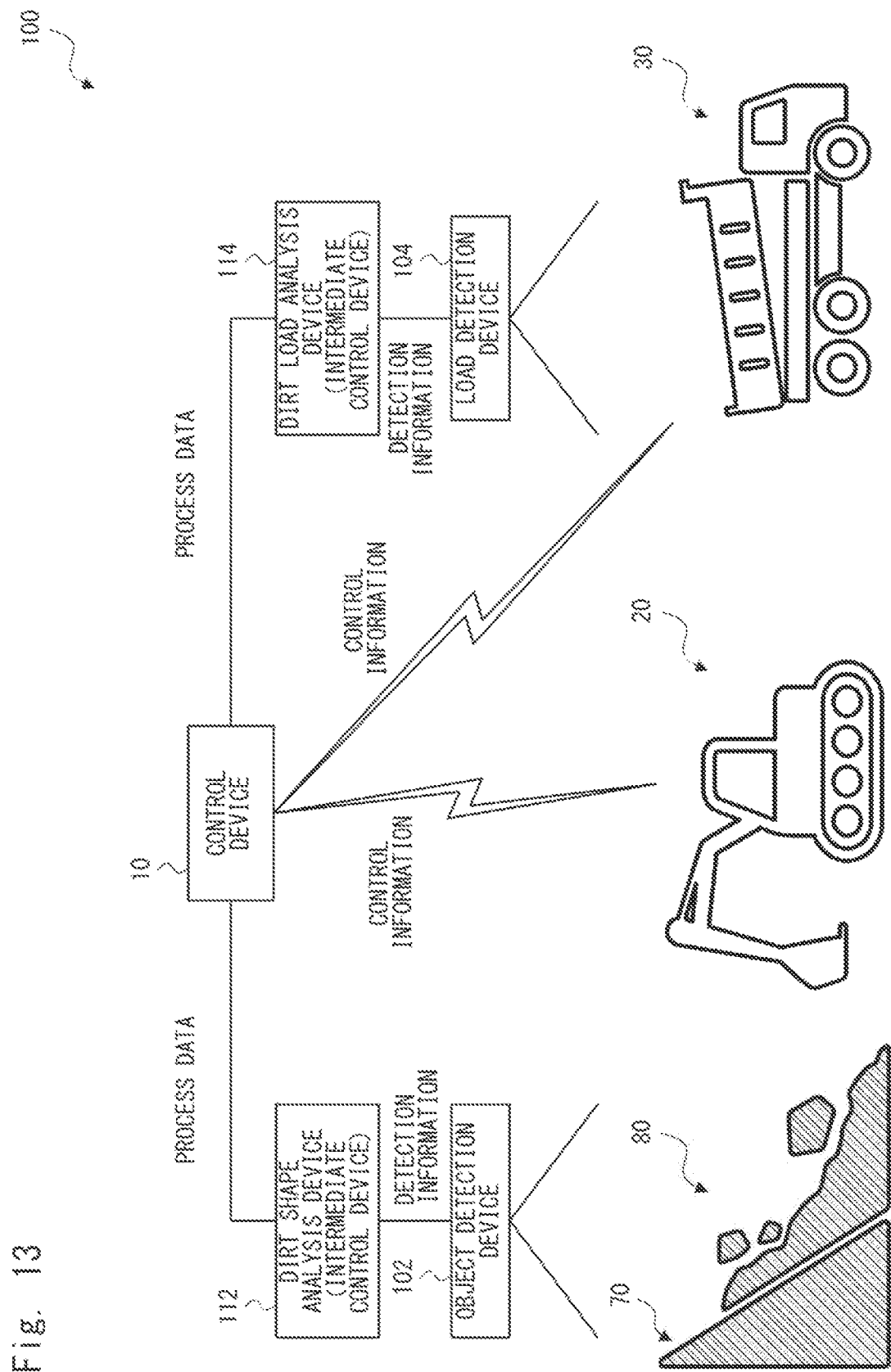
FIG. 13 is a diagram illustrating a configuration of an excavation system according to a fifth example embodiment.

FIG. 13 is a diagram illustrating a configuration of an excavation system 100 according to the fifth example embodiment. The excavation system 100 according to the fifth example embodiment includes a control device 10, an excavation device 20, an object detection device 102, a load detection device 104, a dirt shape analysis device 112, and a dirt load analysis device 114. In addition, the excavation system 100 according to the fifth example embodiment includes a transport device 30 corresponding to the loading spot 90. Note that in the present example embodiment, the dirt shape analysis device 112 and the dirt load analysis device 114 do not have to be provided.

The transport device 30 transports the excavated object 80. The transport device 30 is a dump truck, a trailer, a forklift, a railroad car, or a transfer robot, for example. The transport device 30 is communicably connected to the control device 10 via a wireless connection. The control device 10 is capable of controlling operations of the transport device 30. In other words, the transport device 30 operates under control by the control device 10.

Specifically, the control device 10 determines operations of the transport device 30 (first device), which is a device other than the excavation device 20, on the basis of load data. Thereafter, the control device 10 transmits control information related to operations of the transport device 30 (transport device control information, i.e., transport apparatus control information) to the transport device 30. The transport device 30 operates according to the control information. Hereinafter, a specific example of controlling the transport device 30 will be described. In the example described below, the control device 10 determines operations of the transport device 30 on the basis of load data, and transmits control information related to operations of the transport device 30 to the transport device 30.

Figure 14:
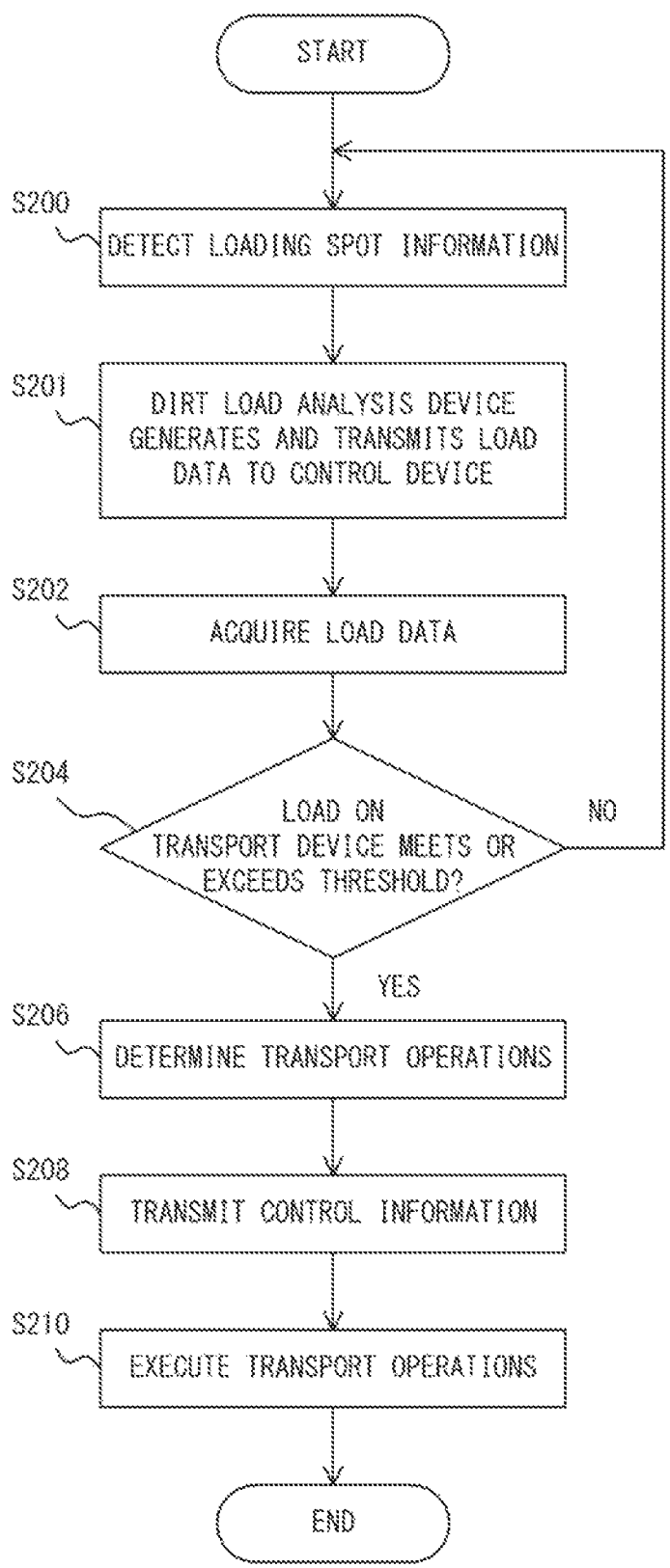
FIG. 14 is a flowchart illustrating a method of controlling a transport device performed by the excavation system according to the fifth example embodiment.

FIG. 14 is a flowchart illustrating a method of controlling the transport device 30 performed by the excavation system 100 according to the fifth example embodiment. Note that FIG. 14 illustrates a control method (5202 to 5208) executed by the control device 10 according to the fifth example embodiment. Similar to S100, the load detection device 104 detects loading spot information (step S200). Similar to S102, the dirt load analysis device 114 generates and transmits load data to the control device 10 (step S201). Similar to S104, the control device 10 acquires (receives) the load data (step S202). Note that in the case where the dirt load analysis device 114 is not provided, the process of S201 and S202 may be replaced with the process of S22 in FIG. 4.

The determination unit 14 of the control device 10 uses the load data to determine whether or not the load on the transport device 30 meets or exceeds a predetermined threshold (step S204). For example, in the case where the load data is dirt quantity data, the determination unit 14 determines whether or not the quantity of dirt loaded onto the transport device 30 meets or exceeds a threshold. As another example, in the case where the load data is three-dimensional map data of dirt, the determination unit 14 determines whether or not the height of dirt loaded onto the transport device 30 meets or exceeds a threshold.

In the case where the load on the transport device 30 does not meet or exceed the threshold (step S204, NO), the process returns to the beginning. Thereafter, the process from S10 to S18 or the process from S20 to S28 may be executed. On the other hand, in the case where the load on the transport device 30 meets or exceeds the threshold (S204, YES), the determination unit 14 determines that the load on the transport device 30 has reached a permissible level (is full). Thereafter, the determination unit 14 determines transport operations of the transport device 30 (step S206). The transport operations are operations for which the transport device 30 transports the object 80 which is the load. For example, the transport operations include starting an engine of the transport device 30 and controlling an accelerator and steering mechanism to transport dirt (the object 80) to a designated collection spot. In this case, the transport operations may also include turning on an automatic control (self-driving) function of the transport device 30.

The control device 10 transmits control information related to transport operations of the transport device 30 (transport device control information) to the transport device 30 (step S208). Specifically, the transmission unit 16 controls the transmission of control information related to transport operations to the transport device 30. At this time, the transmission unit 16 may also generate the control information related to transport operations.

The transport device 30 executes transport operations according to the received control information (step S210). Specifically, the transport device 30 causes a driving unit such as an engine, an accelerator, and a steering mechanism to operate in accordance with the control information. With this arrangement, the transport device 30 starts moving to the collection spot.

In this way, in the excavation system 100 according to the fifth example embodiment, the control device 10 is configured to control operations of a device (first device) other than the excavation device 20. Consequently, the work efficiency for the worksite as a whole can be improved. Also, in the excavation system 100 according to the fifth example embodiment, the control device 10 determines operations of the transport device 30 on the basis of load data, and transmits control information related to operations of the transport device 30 to the transport device 30. With this arrangement, when the load on the transport device 30 reaches a permissible level, the transport device 30 can be made to move without inconveniencing the workers. Consequently, the work efficiency can be improved further.

Note that the control device 10 may also control a device (first device) other than the excavation device 20 and the transport device 30. For example, the control device 10 may control an annunciator (first device) provided in a control room or the like in the case where the loading spot 90 is not the transport device 30. Additionally, in the case where the load on the transport device 30 meets or exceeds the threshold (S204, YES), the determination unit 14 of the control device 10 determines operations of the annunciator. Specifically, the determination unit 14 determines to cause the annunciator to output a notification (full notification) indicating that the loading spot 90 is full. Thereafter, the transmission unit 16 of the control device 10 transmits control information for causing the annunciator to output the full notification to the annunciator. With this arrangement, the annunciator issues a notification on a screen, by sound, with a lamp, or the like to indicate that the loading spot 90 is full.

As another example, the control device 10 may control a work machine of any type, including construction machines such as land preparation machines (such as bulldozers and motor graders). Note that as illustrated in FIG. 8, the excavation device 20 according to the fifth example embodiment may also include the equipment detection device 106. Also, the excavation system 100 according to the fifth example embodiment may include the intermediate control devices described in the fourth example embodiment. The same also applies to the other example embodiments hereinafter.

Sixth Example Embodiment

Next, the sixth example embodiment will be described with reference to the drawings. To clarify the explanation, the following description and drawings are abbreviated or simplified where appropriate. Also, in the drawings, like elements are denoted with like signs, and a duplicate description of such elements is omitted where appropriate. The sixth example embodiment corresponds to a more specific configuration of the first to third example embodiments described above. The sixth example embodiment differs from the other example embodiments described above in that a plurality of loading spots 90 exist.

Figure 15:
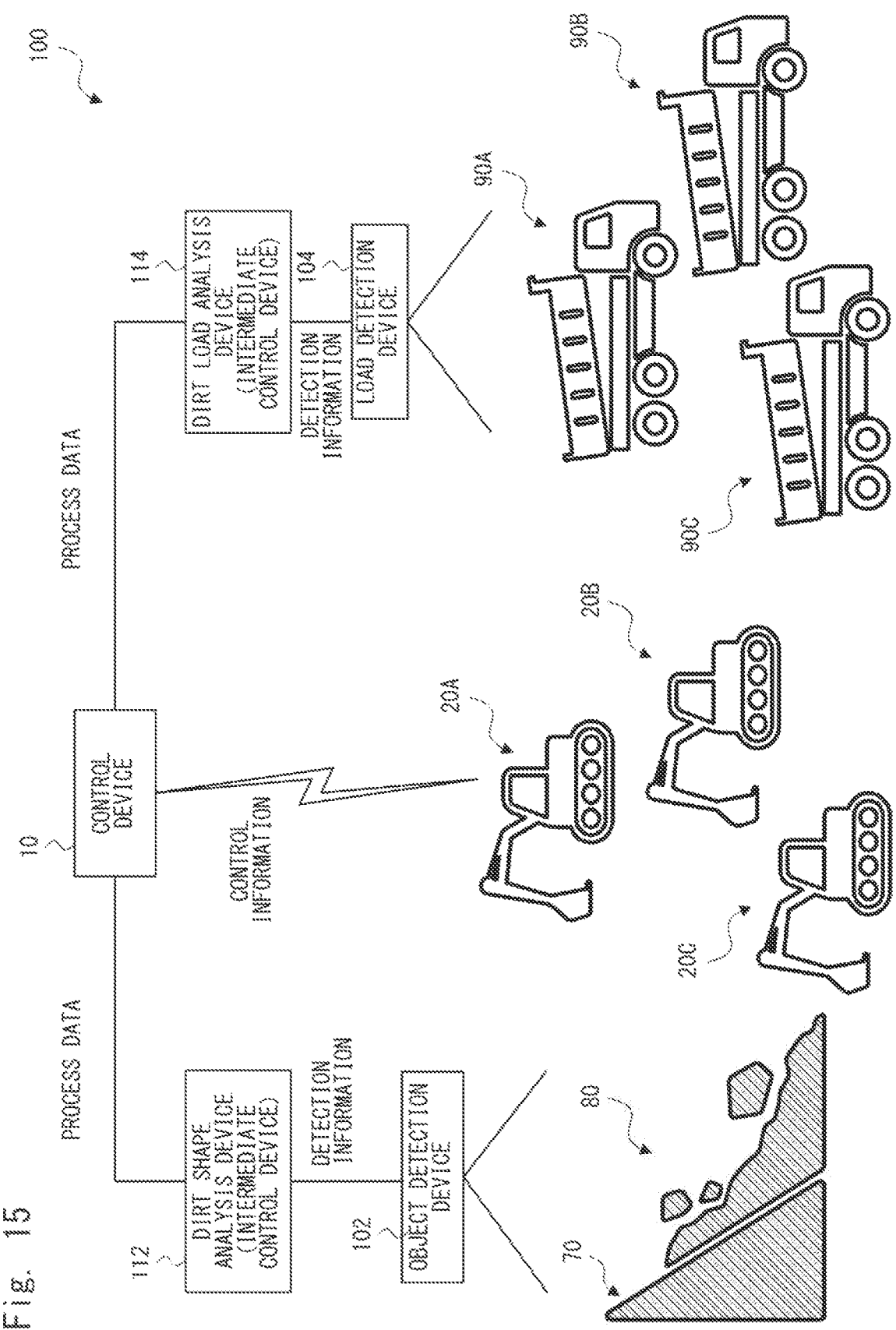
FIG. 15 is a diagram illustrating a configuration of an excavation system according to a sixth example embodiment.

FIG. 15 is a diagram illustrating a configuration of an excavation system 100 according to the sixth example embodiment. The excavation system 100 according to the sixth example embodiment includes a control device 10, a plurality of excavation devices 20A, 20B, and 20C, an object detection device 102, a load detection device 104, a dirt shape analysis device 112, and a dirt load analysis device 114. Here, in the sixth example embodiment, a plurality of loading spots 90A, 90B, and 90C exist. The load detection device 104 detects information related to each of the plurality of the loading spots 90A to 90C (loading spot information). A plurality of load detection devices 104 may also be disposed respectively at the plurality of loading spots 90. Note that although three excavation devices 20 and three loading spots 90 are illustrated in FIG. 15, there may be any number of excavation devices 20 and any number of loading spots 90. Moreover, the number of excavation devices 20 and the number of loading spots 90 do not have to be the same. Also, in the present example embodiment, the dirt shape analysis device 112 and the dirt load analysis device 114 do not have to be provided.

The control device 10 determines which of the plurality of loading spots 90A to 90C to treat as the loading spot 90 where the excavation device 20 will execute operations. Note that in the example given below, the control device 10 determines which of the plurality of loading spots 90 to treat as the loading spot 90 where the excavation device 20 will execute operations on the basis of respective load data for each of the plurality of loading spots 90.

Figure 16:
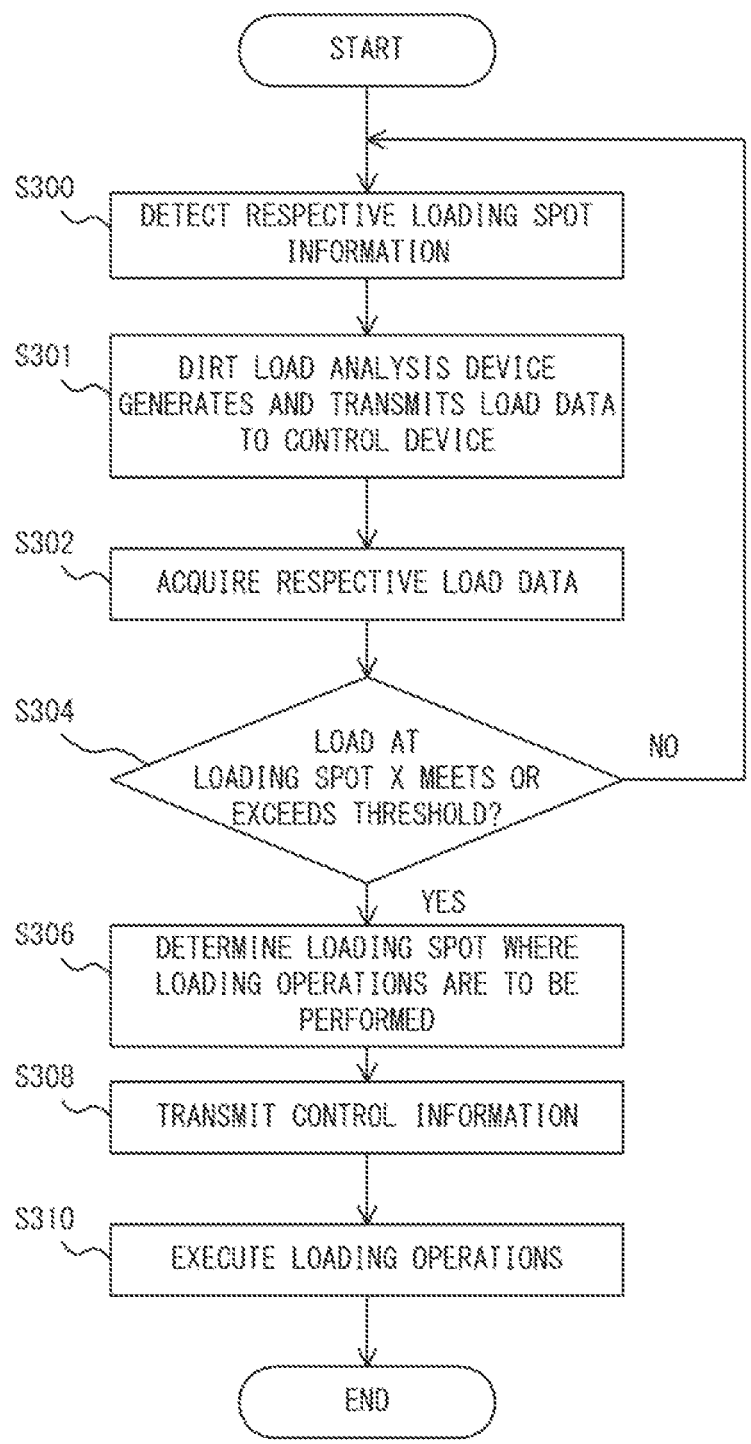
FIG. 16 is a flowchart illustrating a process executed by the excavation system according to the sixth example embodiment.

FIG. 16 is a flowchart illustrating a process executed by the excavation system 100 according to the sixth example embodiment. Note that FIG. 16 illustrates a control method (S302 to S308) executed by the control device 10 according to the sixth example embodiment. Similar to S100, the load detection device 104 detects respective loading spot information for each of the plurality of loading spots 90 (step S300). Similar to S102, the dirt load analysis device 114 generates respective load data from each of the plurality of loading spot information, and transmits the generated load data to the control device 10 (step S301). Similar to S104, the control device 10 acquires (receives) the respective load data related to each of the plurality of loading spots 90 (step S302). Note that in the case where the dirt load analysis device 114 is not provided, the process of S301 and S302 may be replaced with the process of S22 in FIG. 4.

The determination unit 14 of the control device 10 uses the load data to determine whether or not the load at a certain loading spot 90 (loading spot X) meets or exceeds a predetermined threshold (step S304). Note that the determination method may be substantially the same as the determination method according to the process of 5204. In the case where the loads at all loading spots 90 do not meet or exceed the threshold (step S304, NO), the process returns to the beginning. Thereafter, the process from S10 to S18 or the process from S20 to S28 may be executed.

On the other hand, in the case where the load at a certain loading spot 90 meets or exceeds the threshold (S304, YES), the determination unit 14 determines that the load at the certain loading spot 90 (loading spot X) has reached a permissible level (is full). In this case, the determination unit 14 determines the loading spot 90 where each excavation device 20 will perform loading operations (step S306). Note that at this time, the determination unit 14 may perform substantially the same process as S24.

For example, suppose that the control device 10 controls each excavation device 20 such that the excavation device 20A performs loading operations at the loading spot 90A, the excavation device 20B performs loading operations at the loading spot 90B, and the excavation device 20C performs loading operations at the loading spot 90C. In this case, when the loading spot 90A becomes full, the determination unit 14 determines the loading spot 90B or the loading spot 90C as the loading spot 90 where the excavation device 20A will perform loading operations. Furthermore, at this time, the determination unit 14 may also determine whether the loading spot 90B or the loading spot 90C has the larger (or smaller) load, and determine the loading spot with the larger (or smaller) load as the loading spot 90 where the excavation device 20A will perform loading operations. Also, in this case, the determination unit 14 determines the loading spot 90B as the loading spot 90 where the excavation device 20B will perform loading operations. Similarly, the determination unit 14 determines the loading spot 90C as the loading spot 90 where the excavation device 20C will perform loading operations.

The control device 10 transmits to each excavation device 20 control information indicating the loading spot 90 where the corresponding excavation device 20 will perform loading operations (step S308). Specifically, the transmission unit 16 controls the transmission of control information to each excavation device 20. At this time, the transmission unit 16 may also generate control information indicating the loading spot 90 where loading operations are to be performed.

The excavation devices 20 execute loading operations according to the received control information (step S310). Specifically, each excavation device 20 performs loading operations with respect to the loading spot 90 indicated by the control information. In the above example, the excavation device 20A performs loading operations with respect to the loading spot 90B or the loading spot 90C. Also, the excavation device 20B performs loading operations with respect to the loading spot 90B. The excavation device 20C performs loading operations with respect to the loading spot 90C.

Note that although FIG. 15 illustrates an example in which a plurality of excavation devices 20 exist, there does not have to be a plurality of excavation devices 20. Also, the process of S304 illustrated in FIG. 16 may be omitted. In this case, the determination unit 14 may determine the loading spot 90 where each excavation device 20 will perform loading operations in S306 according to the load at each loading spot 90 for example, without performing the process of S304. For example, the determination unit 14 may determine loading operations such that the excavation device 20A performs loading operations with respect to the loading spot 90 having a larger load than the other loading spots 90, and the excavation device 20B performs loading operations with respect to the loading spot 90 having a smaller load than the other loading spots 90.

As described above, in the excavation system 100 according to the sixth example embodiment, the control device 10 is configured to determine which of the plurality of loading spots 90 to treat as the loading spot 90 where the excavation device 20 will execute operations. With this arrangement, the work efficiency can be improved. Particularly, in the case where a plurality of excavation devices 20 exist, the control device 10 can coordinate the plurality of excavation devices 20 and keep one excavation device 20 from obstructing another excavation device 20.

Also, in the excavation system 100 according to the sixth example embodiment, the control device 10 determines which of the plurality loading spots 90 to treat as the loading spot 90 where the excavation device 20 will execute operations on the basis of respective load data for each of the plurality of loading spots 90. With this arrangement, the excavation device 20 can avoid performing loading operations with respect to a loading spot 90 that is full. Consequently, the work efficiency can be improved.

Seventh Example Embodiment

Next, the seventh example embodiment will be described with reference to the drawings. To clarify the explanation, the following description and drawings are abbreviated or simplified where appropriate. Also, in the drawings, like elements are denoted with like signs, and a duplicate description of such elements is omitted where appropriate. The seventh example embodiment corresponds to a more specific configuration of the first to third example embodiments described above. The seventh example embodiment differs from the other example embodiments described above in that a plurality of worksites exists.

Figure 17:
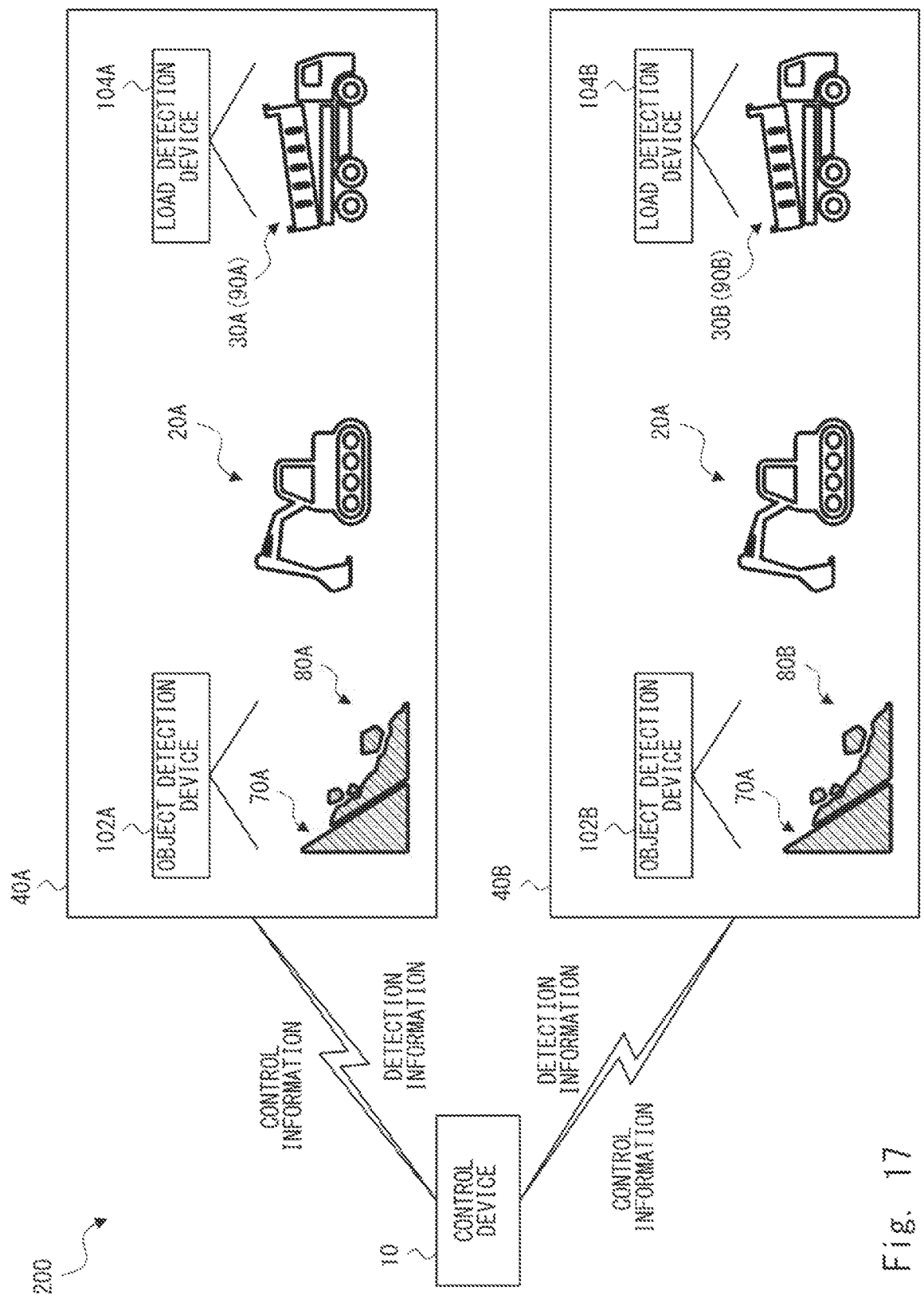
FIG. 17 is a diagram illustrating a configuration of an excavation system according to a seventh example embodiment.

FIG. 17 is a diagram illustrating a configuration of an excavation system 200 according to the seventh example embodiment. The excavation system 200 includes a control device 10 and a plurality of worksites 40A and 40B. The worksite 40A includes an excavation device 20A, an object detection device 102A, a load detection device 104A, an excavation spot 70A, an object 80A, and a transport device 30A (loading spot 90A). The worksite 40B includes an excavation device 20B, an object detection device 102B, a load detection device 104B, an excavation spot 70B, an object 80B, and a transport device 30B (loading spot 90B). The control device 10 is communicably connected to each detection device, excavation device 20, and transport device 30 at each worksite 40 via a wireless connection. Note that in the seventh example embodiment, the loading spots 90 are taken to be transport devices 30, but the loading spots 90 do not have to be transport devices 30. Also, although two worksites 40 are illustrated in FIG. 17, there may be any number of worksites 40.

The worksite 40A will be described. The excavation device 20A excavates the object 80A (dirt) at the excavation spot 70A. The excavation device 20A loads (such as by releasing) the excavated object 80A onto the transport device 30A (loading spot 90A). The object detection device 102A detects detection information (object information) related to the object 80A at the excavation spot 70A. The load detection device 104A detects detection information (loading spot information) related to the object 80 loaded onto the transport device 30A (loading spot 90A). The transport device 30 transports the loaded object 80 to a designated location outside the worksite 40A. Note that the same also applies to the worksite 40B.

The control device 10 receives detection information (object information and loading spot information) from each detection device (object detection device 102 and load detection device 104) at each worksite 40. The control device 10 determines operations of the excavation device 20 at each of the plurality of worksites 40 according to the detection information (target location data and load data) received from each detection device at each worksite 40. Thereafter, the control device 10 transmits control information indicating operations of each excavation device 20 to the corresponding excavation device 20. Also, the control device 10 determines operations of the transport device 30 at each of the plurality of worksites 40 according to process data (target location data and load data) obtained from the detection information received from each detection device at each worksite 40. Thereafter, the control device 10 transmits control information indicating operations of each transport device 30 to the corresponding transport device 30.

In other words, the control device 10 analyzes the situation at each of the plurality of worksites 40 on the basis of at least one of the target location data related to each of the plurality of worksites 40 or the load data related to each of the plurality of worksites 40. Thereafter, the control device 10 transmits to the excavation device 20 at each of the plurality of worksites 40 control information related to the excavation device 20 at each of the plurality of worksites 40 according to the analyzed situation. In addition, the control device 10 transmits to the transport device 30 at each of the plurality of worksites 40 control information related to operations of the transport device 30 at each of the plurality of worksites 40 according to the analyzed situation.

Figure 18:
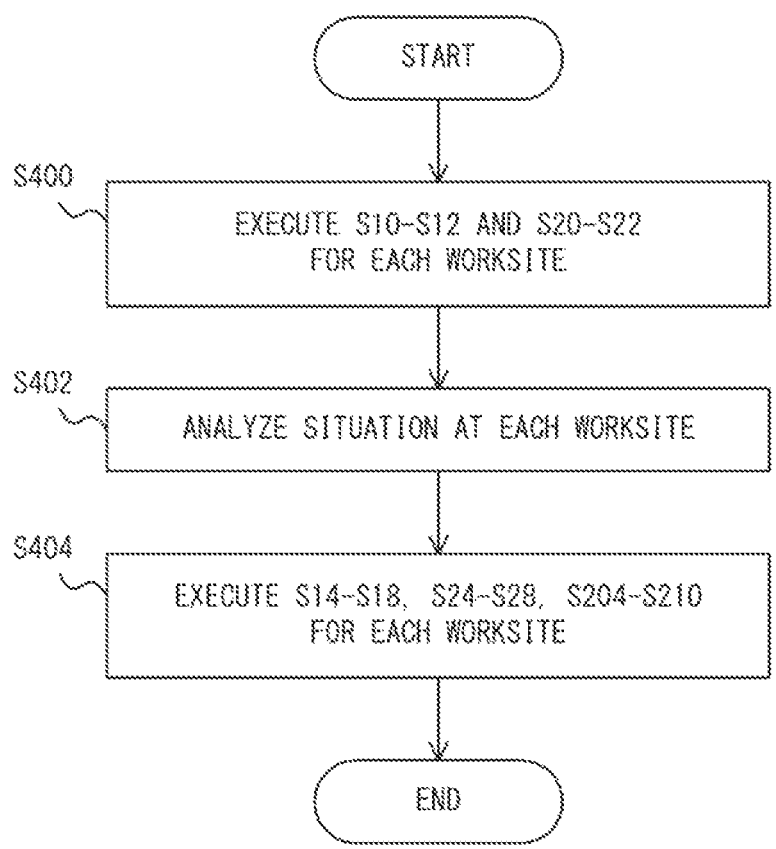
FIG. 18 is a flowchart illustrating a process executed by the excavation system according to the seventh example embodiment.

FIG. 18 is a flowchart illustrating a process executed by the excavation system 200 according to the seventh example embodiment. First, the processes from S10 to S12 and from S20 to S22 are executed with respect to each worksite 40 (step S400). In other words, the object detection device 102 at each worksite 40 acquires object information (S10). The control device 10 acquires target location data related to each worksite 40 (S12). Also, the load detection device 104 at each worksite 40 acquires loading spot information (S20). The control device 10 acquires load data related to each worksite 40 (S22).

The control device 10 analyzes the situation at each worksite 40 on the basis of the target location data and the load data related to each worksite 40 (step S402). Specifically, the determination unit 14 of the control device 10 analyzes the progress at each worksite 40. Thereafter, at least one of the processes from S14 to S18, from S24 to S28, or from S204 to S210 is executed with respect to each worksite 40 (step S404). Hereinafter, a specific example will be described.

For example, the determination unit 14 determines from the load data that the load on the transport device 30A has reached a permissible level, at the worksite 40A. Consequently, the determination unit 14 determines to move the transport device 30A, at the worksite 40A. On the other hand, the determination unit 14 determines from the load data that the load on the transport device 30B has not reached a permissible level, at the worksite 40B. Consequently, the determination unit 14 determines not to move the transport device 30B yet, at the worksite 40B.

In this case, for the worksite 40A, the determination unit 14 determines to move the transport device 30A (S206). Thereafter, the transmission unit 16 controls the transmission of control information for moving the transport device 30A to the transport device 30A (S208). With this arrangement, the transport device 30A starts moving (S210). On the other hand, for the worksite 40B, the determination unit 14 determines to continue with excavation operations (S14). The transmission unit 16 controls the transmission of control information related to excavation operations to the excavation device 20 (S16). With this arrangement, the excavation device 20 executes excavation operations (S18). This arrangement makes it possible to avoid a situation in which the transport device 30B at the worksite 40B impedes the progress of the transport device 30A at the worksite 40A. In other words, it is possible to avoid a situation in which the transport devices 30 become concentrated at a transport destination of the object 80 and create a traffic jam or the like.

As another example, the determination unit 14 determines from the load data that the load on the transport device 30A will reach a permissible level soon, at the worksite 40A. Consequently, the determination unit 14 determines a timing at which the transport device 30A should be moved soon, at the worksite 40A. On the other hand, the determination unit 14 determines from the load data that the load on the transport device 30B has reached a permissible level, at the worksite 40B. Consequently, the determination unit 14 determines to move the transport device 30B, at the worksite 40B.

In this case, for the worksite 40A, the determination unit 14 determines to level the object 80 loaded onto the transport device 30A (S24). On the other hand, for the worksite 40B, the determination unit 14 determines to move the transport device 30B (S206). Thereafter, the transmission unit 16 controls the transmission of control information for leveling the loaded object 80 to the excavation device 20A (S26). With this arrangement, the excavation device 20A levels the object 80 loaded onto the transport device 30A (S28). On the other hand, the transmission unit 16 controls the transmission of control information for moving the transport device 30B to the transport device 30B (S208). With this arrangement, the transport device 30B starts moving (S210). This arrangement makes it possible to avoid a situation in which the transport device 30A at the worksite 40A impedes the progress of the transport device 30B at the worksite 40B. In other words, it is possible to avoid a situation in which the transport devices 30 become concentrated at a transport destination of the object 80 and create a traffic jam or the like.

Note that the control device 10 is capable of controlling operations in ways other than the examples described above. For example, the control device 10 is also capable of coordinating the worksite 40A and the worksite 40B. For example, the determination unit 14 may determine from the load data for the worksite 40A that progress is stalled at the worksite 40A. In this case, the determination unit 14 may determine to dispatch the excavation device 20B (and the transport device 30B) at the worksite 40B to the worksite 40A. Alternatively, in this case, the determination unit 14 may determine to abandon work at the worksite 40A. At this time, the determination unit 14 may determine to withdraw the excavation device 20A and the transport device 30A from the worksite 40A and dispatch the excavation device 20A and the transport device 30A to the worksite 40B.

In this way, the control device 10 of the excavation system 200 according to the seventh example embodiment is configured to analyze the situation at a plurality of worksites 40 and determine the work to be performed at each of the plurality of worksites 40. This arrangement makes it possible to improve the work efficiency for the plurality of worksites 40 as a whole.

Hardware Configuration Example

Figure 19:
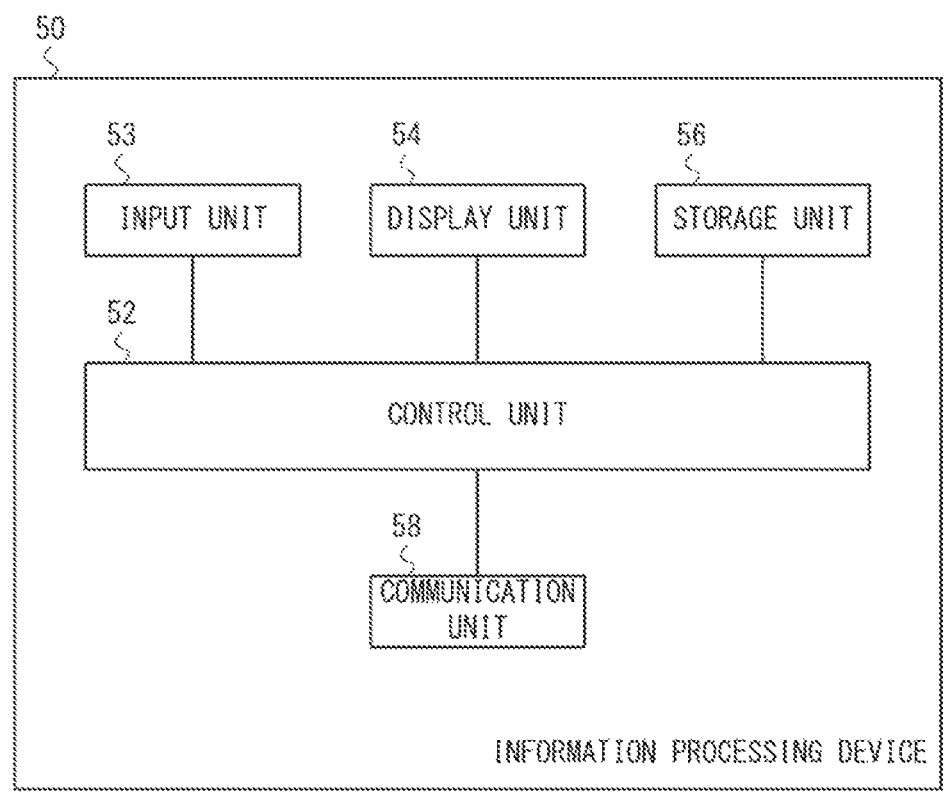
FIG. 19 is a diagram illustrating an example of a hardware configuration of each device included in the excavation system according to the example embodiments.

FIG. 19 is a diagram illustrating an example of a hardware configuration of each device included in the excavation system according to the example embodiments. Each device (the control device 10 and the intermediate control devices) may be achieved by an information processing device 50. The information processing device 50 includes a control unit 52, an input unit 53, a display unit 54, a storage unit 56, and a communication unit 58. With these components, the information processing device 50 (each device) functions as a computer.

The control unit 52 is a computational processing device (processor) such as a CPU, for example. The control unit 52 controls operations of the information processing device 50. The control unit 52 controls operations of the input unit 53, the display unit 54, the storage unit 56, and the communication unit 58. The control unit 52 also performs necessary processing according to operations received by the input unit 53. The control unit 52 also controls the display of necessary information on the display unit 54. The control unit 52 also performs necessary processing according to information and signals received by the communication unit 58. Furthermore, the control unit 52 may execute a program stored in the storage unit 56. With this arrangement, the components (the acquisition unit 12, the determination unit 14, and the transmission unit 16) of the control device 10 may be achieved.

The input unit 53 and the display unit 54 are a user interface. The input unit 53 may be achieved by providing a touch panel, a keyboard or mouse, or the like. The display unit 54 can be achieved by providing a display device such as a touch panel or a liquid crystal display (LCD), or by providing a printer or the like. Moreover, the input unit 53 and the display unit 54 may be configured as a physically unified device such as a touch panel.

The storage unit 56 is a storage device such as a memory or a hard disk, for example. The storage unit 56 stores various programs and various information. The communication unit 58 is a device that performs processing necessary for the control device 10, the intermediate control devices, and the detection devices to communication with each other via a wired or wireless connection.

Note that the components of the control device 10 are not limited to being achieved in software by a program. At least one component of the control device 10 may also be achieved by a combination of any of hardware, firmware, and software or the like. Additionally, the components of the control device 10 may also be achieved by using a user-programmable integrated circuit, such as a field-programmable gate array (FPGA) or a microcontroller, for example. In this case, the integrated circuit may be used to achieve a program containing the above components.

Modifications

Note that the present invention is not limited to the above example embodiments, and appropriate modifications are possible within a scope that does not depart from the gist. For example, the plurality of example embodiments described above are applicable to each other. For example, the seventh example embodiment may be combined with the third example embodiment or the fourth example embodiment.

Also, in the flowcharts described above, the order of the processes (steps) may be changed appropriately. For example, in the flowchart illustrated in FIG. 7, the process of S34 may be executed before the process of S30.

In addition, the control device 10 does not need to be a physically singular device. In other words, the control device 10 can be achieved by a plurality of physically separated devices. Furthermore, the plurality of process of the control device 10 described above may be executed respectively by the plurality of devices. In other words, the process of the acquisition unit 12, the process of the determination unit 14, and the process of the transmission unit 16 may be performed by a plurality of different devices (control devices 10).

Also, the intermediate control devices according to the example embodiments described above generate process data from each detection information and the control device 10 determines operations of the excavation device 20 and the like, but the present invention is not limited to such a configuration. The intermediate control devices may also determine operations of the excavation device 20 and the like, and transmit data indicating the determined operations to the control device 10. Alternatively, the control device 10 may include the functions of the intermediate control devices described above. In this case, the control device 10 may generate process data from each detection information and determine operations of the excavation device 20 and the like.

Also, in the example embodiments described above, a construction machine (excavation device 20) performs excavation operations, but the present invention is not limited to such a configuration. The example embodiments are applicable to the case where a work machine of any type performs work at a worksite. The work machine may treat a work target such as lumber, iron or steel pipes, rebar, or sheet metal as the object 80, for example, and perform work with respect to such an object 80. The work machine may include construction equipment or heavy machinery, for example. The work machine may also be a bulldozer, a crane, a dump truck, a trailer, or a forklift, for example.

Figure 20:
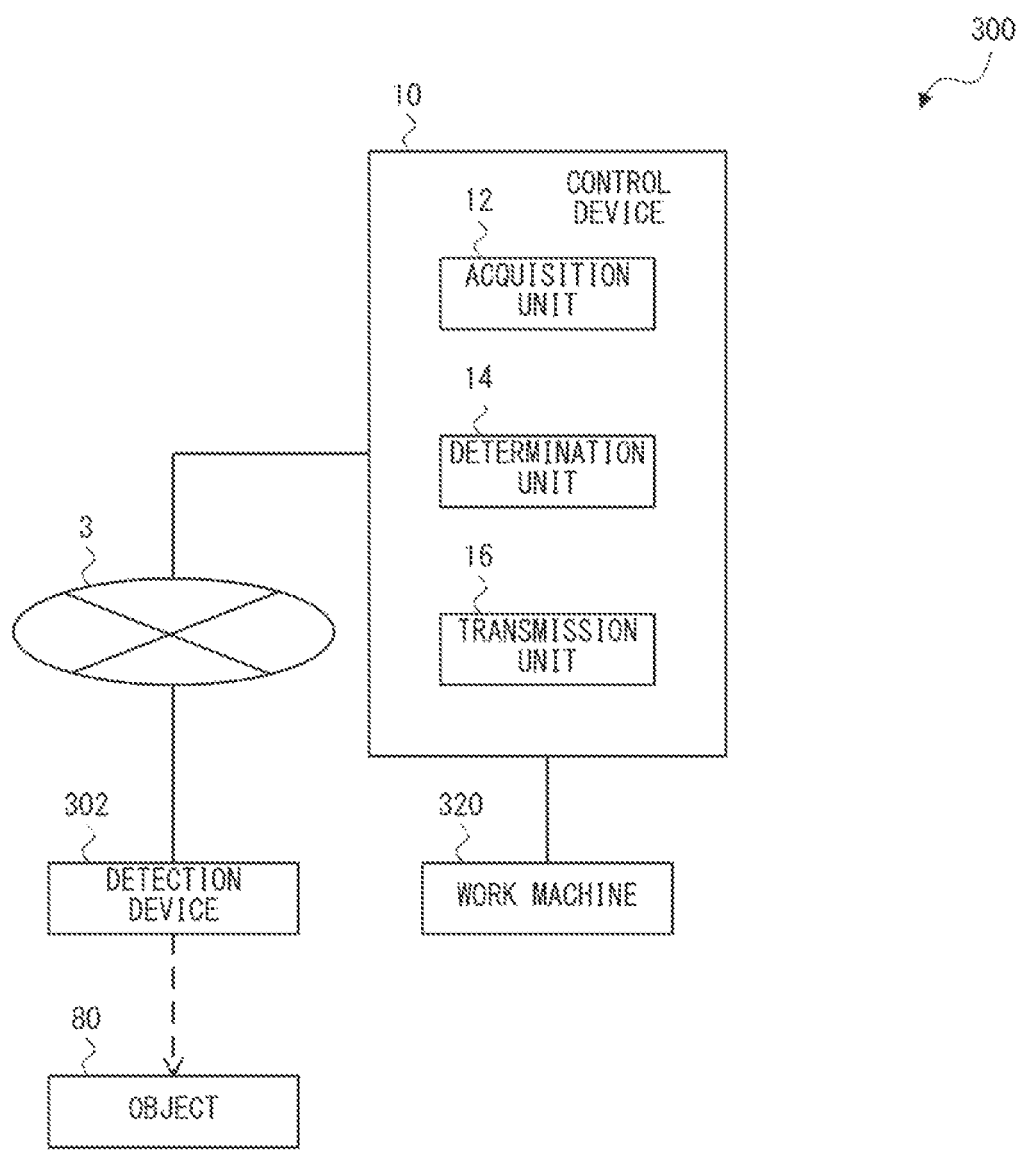
FIG. 20 is a diagram illustrating a configuration of a work system according to a modification.

FIG. 20 is a diagram illustrating a configuration of a work system 300 according to a modification. The work system 300 corresponds to an excavation system, and includes a detection device 302 that corresponds to a first detection device, a work machine 320 that corresponds to an excavation device 20, and a control device 10. The work machine 320 performs work with respect to an object 80 treated as a work target at a worksite. The detection device 302 is installed in a location away from the work machine 320, and detects information related to the object 80 at the worksite. The control device 10 transmits to the work machine 320 control information related to operations of the work machine 320 determined on the basis of target location data indicating the position of the object 80 acquired on the basis of the information related to the object 80. In other words, the control device 10 transmits to the work machine 320 control information related to operations of the work machine 320 on the basis of target location data indicating the position of the object 80, which corresponds to information related to the object 80. The work machine 320 executes operations in accordance with the control information.

In this case, the acquisition unit 12 of the control device 10 acquires target location data indicating the position of the object 80 from the information related to the object 80 detected by the detection device 302. The determination unit 14 determines operations of the work machine 320 on the basis of the acquired target location data. The transmission unit 16 transmits control information related to operations of the work machine 320 to the work machine 320. With such a configuration, it is likewise possible to improve the work efficiency at the worksite. Furthermore, a control method executed by the control device 10 and a program that executes the control method may also be used to improve the work efficiency at the worksite.

In the example described above, the program may be stored and supplied to a computer by using a non-transitory computer-readable medium of any type. The non-transitory computer-readable medium includes a tangible storage medium of any type. Examples of the non-transitory computer-readable medium include a magnetic recording medium (for example, a flexible disk, magnetic tape, or a hard disk drive), a magneto-optical recording medium (for example, a magneto-optical disc), Compact Disc-Read-Only Memory (CD-ROM), CD-R, CD-R/W, and semiconductor memory (for example, mask ROM, programmable ROM (PROM), erasable PROM (EPROM), flash ROM, or random-access memory (RAM)). Additionally, the program may also be supplied to the computer by a transitory computer-readable medium of any type. Examples of the transitory computer-readable medium include electrical signals, optical signals, and electromagnetic waves. The transitory computer-readable medium can supply the program to the computer through a wired communication channel such as an electric cable or an optical fiber, or through a wireless communication channel.

All or part of the foregoing example embodiments may also be described like the following supplementary note, but are not limited to the following.

(Supplementary Note 1)

An excavation system comprising:

an excavation device configured to excavate an object treated as a target of excavation at an excavation spot;

a first detection device installed at the excavation spot and configured to detect information related to the object; and a control device configured to transmit control information related to operations of the excavation device to the excavation device based on target location data indicating a position of the object corresponding to the information related to the object, wherein the excavation device executes operations for excavation in accordance with the control information.

(Supplementary Note 2)

The excavation system according to Supplementary note 1, further comprising:

a second detection device installed at a loading spot where the object is loaded and configured to detect information related to the loading spot, wherein the control device transmits the control information to the excavation device based on load data indicating a position of the object loaded at the loading spot corresponding to the information related to the loading spot, and the excavation device executes operations for loading in accordance with the control information.

(Supplementary Note 3)

The excavation system according to Supplementary note 2, further comprising:

a third detection device configured to detect information related to a state of the excavation device, wherein the control device transmits the control information to the excavation device based on device data indicating the state of the excavation device corresponding to the information related to the state of the excavation device.

(Supplementary Note 4)

The excavation system according to Supplementary note 3, further comprising:

an intermediate control device configured to transmit process data to be processed by the control device to the control device based on one or more of the information related to the object, the information related to the loading spot, and the information related to the state of the excavation device, wherein the control device transmits control information to the excavation device based on the process data.

(Supplementary Note 5)

The excavation system according to any one of Supplementary notes 2 to 4, wherein the control device determines that the excavation device operates at one or more loading spots from among a plurality of loading spots.

(Supplementary Note 6)

The excavation system according to any one of Supplementary notes 2 to 5, wherein the excavation system includes a plurality of excavation devices, and the control device transmits the control information to each of the excavation devices.

(Supplementary Note 7)

The excavation system according to any one of Supplementary notes 2 to 6, wherein the excavation device, the first detection device, and the excavation spot exist at each of a plurality of worksites, and the control device transmits the control information to the excavation device at each of the plurality of worksites.

(Supplementary Note 8)

The excavation system according to any one of Supplementary notes 2 to 7, wherein the loading spot is a transport device configured to transport the object, and the control device transmits transport device control information related to operations of the transport device to the transport device based on the load data.

(Supplementary Note 9)

The excavation system according to any one of Supplementary notes 1 to 8, wherein the control device determines a path of movement of the excavation device, and transmits the control information corresponding to the path to the excavation device.

(Supplementary Note 10)

A control device comprising:

acquisition means for acquiring target location data indicating a position of an object treated as a target to be excavated by an excavation device at an excavation spot, the target location data corresponding to information related to the object detected by a first detection device installed at the excavation spot;

determination means for determining operations of the excavation device based on the target location data; and transmission means for transmitting control information related to operations of the excavation device to the excavation device.

(Supplementary Note 11)

The control device according to Supplementary note 10, wherein the acquisition means acquires load data indicating a position of the object loaded at a loading spot where the object is loaded, the load data corresponding to information related to the loading spot detected by a second detection device installed at the loading spot, and the determination means determines operations of the excavation device based on the load data.

(Supplementary Note 12)

The control device according to Supplementary note 11, wherein the acquisition means acquires device data indicating a state of the excavation device corresponding to information related to the state of the excavation device detected by a third detection device configured to detect information related to the state of the excavation device, and the determination means determines operations of the excavation device based on the device data.

(Supplementary Note 13)

The control device according to Supplementary note 12, wherein the acquisition means acquires process data to be processed by the control device, the process data being transmitted from an intermediate control device based on one or more of the information related to the object, the information related to the loading spot, and the information related to the state of the excavation device, and the determination means determines operations of the excavation device based on the process data.

(Supplementary Note 14)

The control device according to any one of Supplementary notes 11 to 13, wherein the determination means determines that the excavation device operates at one or more loading spots from among a plurality of loading spots.

(Supplementary Note 15)

The control device according to any one of Supplementary notes 11 to 14, wherein the transmission means transmits the control information to each of a plurality of excavation devices.

(Supplementary Note 16)

The control device according to any one of Supplementary notes 11 to 15, wherein
- the excavation device, the first detection device, and the excavation spot exist at each of a plurality of worksites,
- the determination means determines operations of the excavation device at each of the plurality of worksites, and
- the transmission means transmits the control information to the excavation device at each of the plurality of worksites.

(Supplementary Note 17)

The control device according to any one of Supplementary notes 11 to 16, wherein
- the loading spot is a transport device configured to transport the object,
- the determination means determines operations of the transport device based on the load data, and
- the transmission means transmits transport device control information related to operations of the transport device to the transport device.

(Supplementary Note 18)

The control device according to any one of Supplementary notes 11 to 17, wherein
- the determination means determines a path of movement of the excavation device, and
- the transmission means transmits the control information corresponding to
- the path to the excavation device.

(Supplementary Note 19)

A control method comprising:
- acquiring target location data indicating a position of an object treated as a target to be excavated by an excavation device at an excavation spot, the target location data corresponding to information related to the object detected by a first detection device installed at the excavation spot;
- determining operations of the excavation device based on the target location data; and
- transmitting control information related to operations of the excavation device to the excavation device.

(Supplementary Note 20)

The control method according to Supplementary note 19, comprising:
- acquiring load data indicating a position of the object loaded at a loading spot where the object is loaded, the load data corresponding to information related to the loading spot detected by a second detection device installed at the loading spot; and
- determining operations of the excavation device based on the load data.

(Supplementary Note 21)

The control method according to Supplementary note 20, comprising:
- acquiring device data indicating a state of the excavation device corresponding to information related to the state of the excavation device detected by a third detection device configured to detect information related to the state of the excavation device; and
- determining operations of the excavation device based on the device data.

(Supplementary Note 22)

The control method according to Supplementary note 21, comprising:
- acquiring process data transmitted from an intermediate control device based on one or more of the information related to the object, the information related to the loading spot, and the information related to the state of the excavation device; and
- determining operations of the excavation device based on the process data.

(Supplementary Note 23)

The control method according to any one of Supplementary notes 20 to 22, comprising:
- determining that the excavation device operates at one or more loading spots from among a plurality of loading spots.

(Supplementary Note 24)

The control method according to any one of Supplementary notes 20 to 23, comprising:
- transmitting the control information to each of a plurality of excavation devices.

(Supplementary Note 25)

The control method according to any one of Supplementary notes 20 to 24, wherein
- the excavation device, the first detection device, and the excavation spot exist at each of a plurality of worksites, and
- the control method comprises:
  - determining operations of the excavation device at each of the plurality of worksites; and
  - transmitting the control information to the excavation device at each of the plurality of worksites.

(Supplementary Note 26)

The control method according to any one of Supplementary notes 20 to 25, wherein
- the loading spot is a transport device configured to transport the object, and
- the control method comprises:
  - determining operations of the transport device based on the load data; and
  - transmitting transport device control information related to operations of the transport device to the transport device.

(Supplementary Note 27)

The control method according to any one of Supplementary notes 20 to 26, comprising:
- determining a path of movement of the excavation device; and
- transmitting the control information corresponding to the path to the excavation device.

(Supplementary Note 28)

A non-transitory computer-readable medium storing a program causing a computer to execute a process comprising:
- acquiring target location data indicating a position of an object treated as a target to be excavated by an excavation device at an excavation spot, the target location data corresponding to information related to the object detected by a first detection device installed at the excavation spot;
- determining operations of the excavation device based on the target location data; and
- transmitting control information related to operations of the excavation device to the excavation device.

(Supplementary Note 29)

A work system comprising:

a work machine configured to perform work with respect to an object treated as a target of work at a worksite;

a detection device installed in a location away from the work machine and configured to detect information related to the object at the worksite; and a control device configured to transmit control information related to operations of the work machine to the work machine based on target location data indicating a position of the object corresponding to the information related to the object, wherein the work machine executes operations in accordance with the control information.

(Supplementary Note 30)

A control device comprising:

acquisition means for acquiring target location data indicating a position of an object treated as a target of work performed by a work machine at a worksite, the target location data corresponding to information related to the object detected by a detection device installed in a location away from the work machine;

determination means for determining operations of the work machine based on the target location data; and transmission means for transmitting control information related to operations of the work machine to the work machine.

(Supplementary Note 31)

A control method comprising:

acquiring target location data indicating a position of an object treated as a target of work performed by a work machine at a worksite, the target location data corresponding to information related to the object detected by a detection device installed in a location away from the work machine;

determining operations of the work machine based on the target location data; and transmitting control information related to operations of the work machine to the work machine.

(Supplementary Note 32)

A non-transitory computer-readable medium storing a program causing a computer to execute a process comprising:

acquiring target location data indicating a position of an object treated as a target of work performed by a work machine at a worksite, the target location data corresponding to information related to the object detected by a detection device installed in a location away from the work machine;

determining operations of the work machine based on the target location data; and controlling a transmission of control information related to operations of the work machine to the work machine.

The present invention has been described with reference to example embodiments, but the present invention is not limited by the foregoing. The configuration and details of the present invention may be subjected to various modifications that would occur to persons skilled in the art within the scope of the invention.

This application is based on and claims the benefit of priority from Japanese Patent Application No. 2019-113106 filed in the Japan Patent Office on Jun. 18, 2019, the disclosure of which is incorporated by reference in its entirety.

REFERENCE SIGNS LIST

1 EXCAVATION SYSTEM
2 FIRST DETECTION DEVICE
3 NETWORK
4 SECOND DETECTION DEVICE
6 THIRD DETECTION DEVICE
10 CONTROL DEVICE
12 ACQUISITION UNIT
14 DETERMINATION UNIT
16 TRANSMISSION UNIT
20 EXCAVATION DEVICE
22 OPERATION UNIT
24 DRIVING UNIT
26 OPERATION CONTROL DEVICE
30 TRANSPORT DEVICE
40 WORKSITE
70 EXCAVATION SPOT
80 OBJECT
90 LOADING SPOT
100 EXCAVATION SYSTEM
102 OBJECT DETECTION DEVICE
104 LOAD DETECTION DEVICE
106 EQUIPMENT DETECTION DEVICE
112 DIRT SHAPE ANALYSIS DEVICE
114 DIRT LOAD ANALYSIS DEVICE
116 EQUIPMENT ANALYSIS DEVICE
200 EXCAVATION SYSTEM
300 WORK SYSTEM
302 DETECTION DEVICE
320 WORK MACHINE

The invention claimed is:

1. An excavation system comprising:

an excavation device configured to excavate an object treated as a target of excavation at an excavation spot;

a first detection device comprising a first sensor, the first sensor being installed at a first fixed position above the excavation spot and configured to detect information related to the object;

a second detection device comprising a second sensor, the second sensor being installed at a second fixed position above a loading spot at which the object is loaded, and the second sensor is configured to detect information related to the loading spot; and a control device configured to transmit control information related to operations of the excavation device to the excavation device based on target location data indicating a position of the object corresponding to the information related to the object, wherein the excavation device executes operations for excavation in accordance with the control information, wherein the control device is further configured to transmit the control information to the excavation device based on load data corresponding to the information related to the loading spot, the load data being related to the position of the object, which is loaded at the loading spot, wherein the excavation device is further configured to execute operations for loading in accordance with the control information, wherein the excavation system further comprises a third detection device configured to detect information related to a state of the excavation device, wherein the control device transmits the control information to the excavation device based on device data indicating the state of the excavation device corresponding to the information related to the state of the excavation device,
wherein the excavation system further comprises an intermediate control device configured to transmit process data to be processed by the control device to the control device based on one or more of the information related to the object, the information related to the loading spot, and the information related to the state of the excavation device, and
wherein the control device transmits the control information to the excavation device based on the process data.

2. The excavation system according to claim 1, wherein the control device determines that the excavation device operates at one or more loading spots from among a plurality of loading spots.

3. The excavation system according to claim 1, wherein the excavation device, the first detection device, and the excavation spot exist at each of a plurality of worksites, and
the control device transmits the control information to the excavation device at each of the plurality of worksites.

4. The excavation system according to claim 1, wherein the control device determines a path of movement of the excavation device, and transmits the control information corresponding to the path to the excavation device.

5. A control device comprising:
hardware, including a processor and memory;
an acquirer implemented at least by the hardware and configured to acquire target location data indicating a position of an object treated as a target to be excavated by an excavation device at an excavation spot, the target location data corresponding to information related to the object detected by a first detection device comprising a first sensor, the first sensor being installed at a first fixed position above the excavation spot;
a determiner implemented at least by the hardware and configured to determine operations of the excavation device based on the target location data; and
a transmitter implemented at least by the hardware and configured to transmit control information related to operations of the excavation device to the excavation device,
wherein the acquirer is further configured to acquire load data indicating a position of the object loaded at a loading spot where the object is loaded, the load data corresponding to information related to the loading spot detected by a second detection device comprising a second sensor, the second sensor being installed at a second fixed position above the loading spot,
wherein the determiner is configured to determine and control operations of the excavation device based on the load data,
wherein the acquirer is further configured to acquire device data indicating a state of the excavation device corresponding to information related to the state of the excavation device detected by a third detection device configured to detect information related to the state of the excavation device,
wherein the determiner is further configured to determine and control operations of the excavation device based on the device data,
wherein the acquirer is further configured to acquire process data to be processed by the control device, the process data being transmitted from an intermediate control device based on one or more of the information related to the object, the information related to the loading spot, and the information related to the state of the excavation device, and
wherein the determiner is further configured to determine and control operations of the excavation device based on the process data.

6. The control device according to claim 5, wherein
the excavation device, the first detection device, and the excavation spot exist at each of a plurality of worksites,
the determiner determines operations of the excavation device at each of the plurality of worksites, and
the transmitter transmits the control information to the excavation device at each of the plurality of worksites.

7. The control device according to claim 5, wherein
the determiner determines a path of movement of the excavation device, and
the transmitter transmits the control information corresponding to the path to the excavation device.

8. A control method comprising:
acquiring target location data indicating a position of an object treated as a target to be excavated by an excavation device at an excavation spot, the target location data corresponding to information related to the object detected by a first detection device comprising a first sensor, the first sensor being installed at a first fixed position above the excavation spot;
acquiring load data indicating a position of the object loaded at a loading spot where the object is loaded, the load data corresponding to information related to the loading spot detected by a second detection device comprising a second sensor, the second sensor being installed at a second fixed position above the loading spot;
determining and controlling operations of the excavation device based on the target location data and the load data; and
transmitting control information related to operations of the excavation device to the excavation device;
acquiring device data indicating a state of the excavation device corresponding to information related to the state of the excavation device detected by a third detection device configured to detect information related to the state of the excavation device;
determining and controlling operations of the excavation device based on the device data;
acquiring process data transmitted from an intermediate control device based on one or more of the information related to the object, the information related to the loading spot, and the information related to the state of the excavation device; and
determining and controlling operations of the excavation device based on the process data.

9. The control method according to claim 8, wherein
the excavation device, the first detection device, and the excavation spot exist at each of a plurality of worksites, and
the control method comprises:
determining operations of the excavation device at each of the plurality of worksites; and
transmitting the control information to the excavation device at each of the plurality of worksites.

10. The control method according to claim 8, comprising:
 determining a path of movement of the excavation device; and
 transmitting the control information corresponding to the path to the excavation device.

* * * * *